(12) United States Patent
Paulsen et al.

(10) Patent No.: US 7,939,049 B2
(45) Date of Patent: *May 10, 2011

(54) CATHODE MATERIAL CONTAINING NI-BASED LITHIUM TRANSITION METAL OXIDE

(75) Inventors: Jens M. Paulsen, Daejeon (KR); Hong-Kyu Park, Daejeon (KR); Yong Hoon Kwon, Gyeonggi-do (KR)

(73) Assignee: LG Chem, Ltd. (KR)

(*) Notice: Subject to any disclaimer, the term of this patent is extended or adjusted under 35 U.S.C. 154(b) by 0 days.

This patent is subject to a terminal disclaimer.

(21) Appl. No.: 12/378,899

(22) Filed: Feb. 20, 2009

(65) Prior Publication Data

US 2009/0224215 A1    Sep. 10, 2009

Related U.S. Application Data

(62) Division of application No. 11/104,734, filed on Apr. 13, 2005, now Pat. No. 7,648,693.

(51) Int. Cl.
C01D 1/02 (2006.01)
H01M 4/40 (2006.01)

(52) U.S. Cl. ............... 423/594.4; 423/594.6; 423/599; 423/594.15; 429/231.95

(58) Field of Classification Search .......... 423/594.4, 423/594.6, 599, 594.15; 429/231.96
See application file for complete search history.

(56) References Cited

U.S. PATENT DOCUMENTS

| | | | |
|---|---|---|---|
| 4,980,080 A | 12/1990 | Lecerf et al. | |
| 5,264,201 A | 11/1993 | Dahn et al. | |
| 5,370,948 A | 12/1994 | Hasegawa et al. | |
| 5,393,622 A | 2/1995 | Nitta et al. | |
| 5,718,989 A | 2/1998 | Aoki et al. | |
| 5,795,558 A | 8/1998 | Aoki et al. | |
| 6,040,090 A | 3/2000 | Sunagawa et al. | |
| 6,393,622 B1 | 5/2002 | Rice | |
| 6,835,492 B2 | 12/2004 | Cho et al. | |
| 6,846,592 B2 | 1/2005 | Kweon et al. | |
| 6,875,416 B1 | 4/2005 | Benz et al. | |
| 6,893,776 B2 | 5/2005 | Naruoka et al. | |
| 6,949,233 B2 | 9/2005 | Kweon et al. | |
| 7,381,498 B2 | 6/2008 | Suhara et al. | |
| 2002/0086210 A1 | 7/2002 | Naruoka et al. | |
| 2003/0028519 A1 | 2/2003 | Burgess | |
| 2003/0148182 A1 | 8/2003 | Park et al. | |
| 2004/0161668 A1 | 8/2004 | Maeda et al. | |
| 2005/0089756 A1 | 4/2005 | Ito et al. | |
| 2006/0233696 A1 | 10/2006 | Paulsen et al. | |

FOREIGN PATENT DOCUMENTS

| | | |
|---|---|---|
| CN | 1356737 A | 7/2002 |
| CN | 1595680 A | 3/2005 |
| EP | 1317008 | 6/2003 |
| EP | 2016636 A1 | 1/2009 |
| EP | 2016637 A1 | 1/2009 |
| EP | 2016638 A1 | 1/2009 |
| JP | 3281829 | 12/1991 |
| JP | 3244314 | 10/1992 |
| JP | 8213015 | 8/1996 |
| JP | 10188982 | 7/1998 |
| JP | 10199525 | 7/1998 |
| JP | 11307094 | 11/1999 |
| JP | 2000353525 | 12/2000 |
| JP | 2002145623 | 5/2002 |
| JP | 2002358953 | 12/2002 |
| JP | 2002373658 | 12/2002 |
| JP | 2003034538 | 2/2003 |
| JP | 2003081639 | 3/2003 |
| JP | 2003089526 | 3/2003 |
| JP | 2003297354 | 10/2003 |
| JP | 2004031091 | 1/2004 |
| JP | 2004055539 | 2/2004 |
| JP | 2004071518 | 3/2004 |
| JP | 2004111076 | 4/2004 |
| JP | 2004281253 | 10/2004 |
| JP | 2005025975 | 1/2005 |
| JP | 2005150057 | 6/2005 |
| JP | 2005310744 | 11/2005 |
| JP | 2005-340186 A | 12/2005 |
| JP | 2006107845 | 4/2006 |
| KR | 19980079270 A | 11/1998 |
| KR | 20020036283 A | 5/2002 |
| KR | 20050096191 A | 10/2005 |
| KR | 20060009797 A | 2/2006 |
| WO | WO-99/40029 | 8/1999 |
| WO | WO-00/23380 | 4/2000 |
| WO | WO-2005/020354 | 3/2005 |
| WO | 2006/136050 A1 | 12/2006 |

OTHER PUBLICATIONS

Omanda, et al.; "Improvement of the Thermal Stability of LiNiO.8 CoO.202 Cathode by a SiOx Protective Coating"; Journal of The Electrochemical Society; vol. 151, No. 6; pp. A922-A929; 2004.
Titled: Battery Containing Ni-Based Lithium Transition Metal Oxide.
Titled: Process of Making Cathode Material Containing Ni-Based Lithium Transition Metal Oxide.
U.S. Appl. No. 11/831,516.
U.S. Appl. No. 11/831,522.
U.S. Appl. No. 11/831,530.
U.S. Appl. No. 12/378,883.
U.S. Appl. No. 12/378,946.
Office Action from related Chinese Application No. 200780002216 issued Nov. 6, 2009.
Hu Chen, Study on Synthesis and Property of Lithium Nickel Oxides as Cathode Material for Li-ion Batteries, Chinese Doctoral Dissertations & Master's Theses Full-Text Database, vol. 3, 2004.
Office Action from related Chinese Application No. 200780002247.5 issued Jul. 31, 2009.
Office Action from related Chinese Application No. 200780002247.5 issued Jul. 29, 2010.
Yao Chen et al, Journal of Power Sources, 119-121, 184-188, Dec. 31, 2003.

(Continued)

*Primary Examiner* — Stanley Silverman
*Assistant Examiner* — James A Fiorito
(74) *Attorney, Agent, or Firm* — Lerner, David, Littenberg, Krumholz & Mentlik, LLP

(57) ABSTRACT

The present invention provides for Ni-based lithium transition metal oxide cathode active materials used in lithium ion secondary batteries. The cathode active materials are substantially free of $Li_2CO_3$ impurity and soluble bases.

17 Claims, 13 Drawing Sheets

OTHER PUBLICATIONS

Notice of Rejection from related Taiwanese Application No. 095116589 issued Aug. 3, 2010.

International Search Report, PCT/KR20071002230, dated Aug. 16, 2007.

J. Katana Ngala. Natasha A. Chernova. Luis Matienzo. Peter Y. Zavalij. and M. Stanley Whittingham: liThe Syntheses and Characterization of Layered $LiNi_{1-y-z}Mn_yCo_zO_2$ Compounds Mat. Res. Soc. Symp. Proc., vol. 756.2003. pp. EE6.4.1-EE6.4.6. XP002560562.

J. Katana Ngala. Natasha A. Chernova.Miaomiao Ma. Marc Mamak. Peter Y. Zavalij and M. Stanley Whittingham: "The synthesis. characterization and electrochemical behavior of the layered $LiNiO.4MnO.4CoO.2O_2$ compound" J. Ma T E R. C Hem., vol. 14.2004. pp. 214-220. XP002560563.

Supplementary European Search Report, EP 07746385 dated Dec. 17, 2009.

Tran et al., Journal of The Electrochemical Society, 153 (2) A261-A269, published on Dec. 23, 2005.

Third Party Obervations according to Art. 115 EPC for European Appliction No. 07746385 (EP 2016636) dated May 11, 2009.

International Search Report, PCT/KR2007/002251, dated Aug. 16, 2007.

Supplementary European Search Report, EP 07746404 dated Dec. 17, 2009.

Third Party Obervations according to Art. 115 EPC for European Appliction No. 07746404 (EP 2016637) dated May 11, 2009.

International Search Report, PCT/KR2007/002267, dated Aug. 16, 2007.

Supplementary European Search Report, EP 07746420 dated Dec. 17, 2009.

Third Party Obervations according to Art. 115 EPC for European Appliction No. 07746420 (EP 2016638) dated May 11, 2009.

US 7,939,049 B2

CATHODE MATERIAL CONTAINING NI-BASED LITHIUM TRANSITION METAL OXIDE

CROSS-REFERENCE TO RELATED APPLICATIONS

This application is a divisional of U.S. application Ser. No. 11/104,734, filed on Apr. 13, 2005, the disclosure of which is incorporated herein by reference.

FIELD OF INVENTION

The present invention relates to a powderous Ni-based lithium transition metal oxide, substantially free of soluble bases, prepared on a large scale by a low-cost process. More specifically, for preparation of the Ni-based lithium transition metal oxide, inexpensive precursors, particularly $Li_2CO_3$ as a source of lithium, are employed, and the reaction is performed in air. The Ni-based lithium transition metal oxide is free of $Li_2CO_3$ impurity and has a low content of soluble bases and improved stability in air. The Ni-based lithium transition metal oxide powder can be preferably used as a cathode active material in rechargeable lithium batteries. Batteries containing such cathode active material exhibit high capacity, high cycling stability, much improved stability during high temperature storage, and in particular, reduced gas evolution and improved safety.

BACKGROUND OF THE INVENTION $LiNiO_2$-based cathode active materials are promising candidates to replace $LiCoO_2$ in commercial rechargeable batteries. The advantages of such an active cathode are summarized in the below.

(1) Price and Availability of Raw Materials:

Increasing quantities of the world production of Co are used for the production of $LiCoO_2$. This share will further increase as the actual growth of the Li-battery market and particularly the trend of implementing larger Li-batteries continues. Since Co resources are limited, its price is expected to rise. On the other hand, the price of Ni is low, and its much larger market is expected to be able to easily adsorb demand from a growing battery industry.

(2) Capacity:

The reversible capacity of doped $LiNiO_2$ is approx. 200 mAh/g when charged to 4.3V, exceeding the capacity of $LiCoO_2$ (approx. 165 mAh/g). Therefore, despite a slightly lower average discharge voltage and slightly lower volumetric density, commercial cells with $LiNiO_2$ cathode have an improved energy density.

However, there are severe problems that hinder the wide and successful implementation of $LiNiO_2$-based cathode active materials as described in below.

(A) Price:

It is generally accepted that $LiNiO_2$ of high quality cannot be prepared by such simple methods as are used for $LiCoO_2$ production, i.e., simple solid state reaction of a Co precursor with $LiCoO_2$. Actually, doped $LiNiO_2$ cathode materials in which an essential dopant is cobalt and further dopants are Mn, Al, etc. are produced on a large scale by reacting lithium precursors such as $LiOH*H_2O$ with mixed transition metal hydroxides in a flow of oxygen or synthetic air (i.e., $CO_2$ free). Also, additional steps such as an intermediary washing or coating further increase the cost of such processes.

(B) Safety, Gassing, Gelation and Aging:

Safety: the implementation of $LiNiO_2$ has been delayed by concerns about the safety of $LiNiO_2$ batteries. The safety of the cathode powder can be increased to some extent, for example, by modifying the composition of the cathode powder or optimizing the morphology. Furthermore, the safety of batteries can be improved by battery design, electrolyte modifications, etc.

Storage properties: the commercial implementation of $LiNiO_2$ has particularly been delayed due to poor storage and abuse properties. A severe problem, which has not been solved yet, is the evolution of an excessive amount of gas during storage or cycling. Excessive gas activates the safety switch to shut down a cylindrical cell and also causes a polymer battery to swell. The inventors of the present invention found that there is a correlation between the content of soluble base and the excessive gas evolution, and particularly that the amount of $Li_2CO_3$ (as determined by pH titration) has a close relation to the amount of gas evolved during storage.

Processing: another problem of $LiNiO_2$ involves the stability of the cathode material (when exposed to air and humidity, $LiNiO_2$ deteriorates rapidly) and the gelation of slurries (due to a high pH, the NMP-PVDF slurry starts to polymerize). These properties cause severe processing problems during battery production.

Many prior arts focus on improving properties of $LiNiO_2$-based cathode materials and processes to prepare $LiNiO_2$. However, the problems of high production cost, swelling, poor safety, high pH and the like have not been sufficiently solved. A few examples will be illustrated in below.

U.S. Pat. No. 6,040,090 (T. Sunagawa et al., Sanyo) discloses a wide range of compositions including nickel-based and high-Ni $LiMO_2$, the materials having high crystallinity and to be used in Li-ion batteries in EC containing electrolyte. Samples were prepared on small scale, using $LiOH*H_2O$ as a lithium source. The samples are prepared in a flow of synthetic air being a mixture of oxygen and nitrogen, free of $CO_2$.

U.S. Pat. No. 5,264,201 (J. R. Dahn et al.) discloses a doped $LiNiO_2$ substantially free of lithium hydroxide and lithium carbonate. For this purpose, transition metal hydroxide and $LiOH*H_2O$ as a lithium source are employed and heat treatment is performed under an oxygen atmosphere free of $CO_2$, additionally with a low content of $H_2O$. An excess of lithium "evaporates"; however, "evaporation" is a lab-scale effect and not an option for large-scale preparation.

U.S. Pat. No. 5,370,948 (M. Hasegawa et al., Matsushita) discloses a process to prepare $LiNi_{1-x}Mn_xO_2$ doped by Mn, x<0.45, in which the manganese source is Mn-nitrate, and the lithium source is either lithium hydroxide or lithium nitrate.

U.S. Pat. No. 5,393,622 (Y. Nitta et al., Matsushita) discloses a process to prepare $LiNi_{1-x}Mn_xO_2$ by a two-step heating, involving pre-drying, cooking and the final heating. The final heating is done in an oxidizing gas such as air or oxygen. This patent focuses on oxygen. The disclosed method uses a very low temperature of 550~650° C. for cooking, and less than 800° C. for sintering. At higher temperatures, samples are dramatically deteriorated. Excess lithium is used such that the final samples contain a large amount of soluble bases (i.e., lithium compounds). According to research performed by the inventors of the present invention, the observed deterioration is attributable to the presence of lithium salts and melting at about 700~800° C., thereby detaching the crystallites.

WO 9940029 A1 (M. Benz et al., H. C. Stack) describes a complicated preparation method very different from that disclosed in the present invention. This preparation method involves the use of lithium-nitrates and lithium hydroxides and recovering the evolved noxious gasses. Sintering temperature never exceeds 800° C. and typically is far lower.

U.S. Pat. No. 4,980,080 (Lecerf, SAFT) describes a process to prepare $LiNiO_2$-based cathodes from lithium hydroxide and metal oxides at temperatures below 800° C.

In prior arts including the above, $LiNiO_2$-based cathode active materials are generally prepared by high cost processes, especially in a flow of synthetic gas such as oxygen or synthetic air, free of $CO_2$, and using $LiOH*H_2O$, Li-nitrate, Li acetate, etc. but not the inexpensive, easily manageable $Li_2CO_3$. Furthermore, the final cathode materials have a high content of soluble bases, originating from carbonate impurities present in the precursors, which remain in the final cathode because of the thermodynamic limitation. To remove the soluble bases, additional steps such as washing, coating etc. are required, thereby increasing the cost.

Therefore, there is a strong need for $LiNiO_2$-based cathode active materials able to be prepared at low cost from inexpensive precursors such as $Li_2CO_3$, having a low content of soluble base, showing improved properties such as low swelling when applied to commercial rechargeable lithium batteries, improved safety and high capacity.

SUMMARY OF THE INVENTION

The objects of the present invention are to completely solve the problems described above.

In accordance with the present invention, the above and other objects can be accomplished by the provision of a powderous lithium transition metal oxide with the composition as represented by Formula I below, with being practically free of $Li_2CO_3$ impurity, and prepared by solid state reaction in air from a mixed transition metal precursor and $Li_2CO_3$:

$$Li_xM_yO_2 \quad (1)$$

wherein

M=M'$_{1-k}$A$_k$, where

M'=$Ni_{1-a-b}(Ni_{1/2}Mn_{1/2})_aCo_b$ on condition of $0.65 \leq a+b \leq 0.85$ and $0.1 \leq b \leq 0.4$;

A is a dopant;

$0 \leq k \leq 0.05$; and x+y=2 on condition of $0.95 \leq x \leq 1.05$.

As defined above, the powderous lithium transition metal oxide consists of nickel, manganese and cobalt at a specific composition and has a high content of nickel, and also optionally may further contain less than 5% of dopant (A).

The Ni-based lithium transition metal oxide according to the present invention has a well-layered structure, and also improved safety, cycling stability and stability against aging and low gas evolution during storage, when used as an active material for cathode of lithium secondary batteries, because it has a high sintering stability and is substantially free of soluble bases.

Moreover, the lithium transition metal oxide of the present invention can be prepared by a low-cost process under relatively unrestricted conditions using a mixed transition metal precursor and $Li_2CO_3$ as raw stocks.

In a process for preparation of the lithium transition metal oxide, $Li_2CO_3$ of a low cost is employed as a lithium source, and lithium is not used in an excess amount, and heat treatment is carried out under high flow of air in a reactor, preferably equipped with a heat exchanger.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

The present invention will be described in more detail.

Stoichiometric $LiNiO_2$ in which the transition metal consists of only Ni and the Li:Ni ratio is 1:1 essentially does not exist or is extremely difficult to prepare. Instead, Li-deficient $Li_{1-a}Ni_{+a}O_2$ and doped $LiNi_{1-z}M''_zO_2$ (M''=Co, $Mn_{1/2}Ni_{1/2}$, Al ... ) with a Li:M ratio of 1:1 are more easily achieved.

In the present invention, only the doped $LiNiO_2$ is handled and, for convenience of expression, sometimes referred to as "$LiNi_{1-z}M''_zO_2$" or "doped $LiNiO_2$" in the present disclosure. Generally, the doped $LiNiO_2$ may be in the stoichiometric form or Li-deficient form. Therefore, the stoichiometric form (Li:M=1:1) and Li-deficient form (Li:M<1:1) in the present disclosure will be sometimes referred to as "stoichiometric $LiNiO_2$" and "$Li_{1-a}Ni_{1+a}O_2$", respectively. The doped $LiNiO_2$ has a lower content of 3-valent nickel than pure $LiNiO_2$ but a higher content than any doped $LiCoO_2$ or $LiMnO_2$. In the present disclosure, the term "high-Ni $LiNiO_2$" means that 'z' in the formula $LiNi_{1-z}M''_zO_2$ is 0.7 or more.

The stoichiometric $LiNiO_2$ (i.e., $LiNi_{1-z}M''_zO_2$, but not being Li-deficient) is desirable because it shows a superior electrochemical performance. Li-deficient samples have cation mixing. Cation-mixed samples have transition metal cations being misplaced on lithium sites of the crystal structure. Lithium-deficient Li—Ni-oxide is undesired because it has higher cation mixing which causes poor electrochemical properties.

Figure 1:
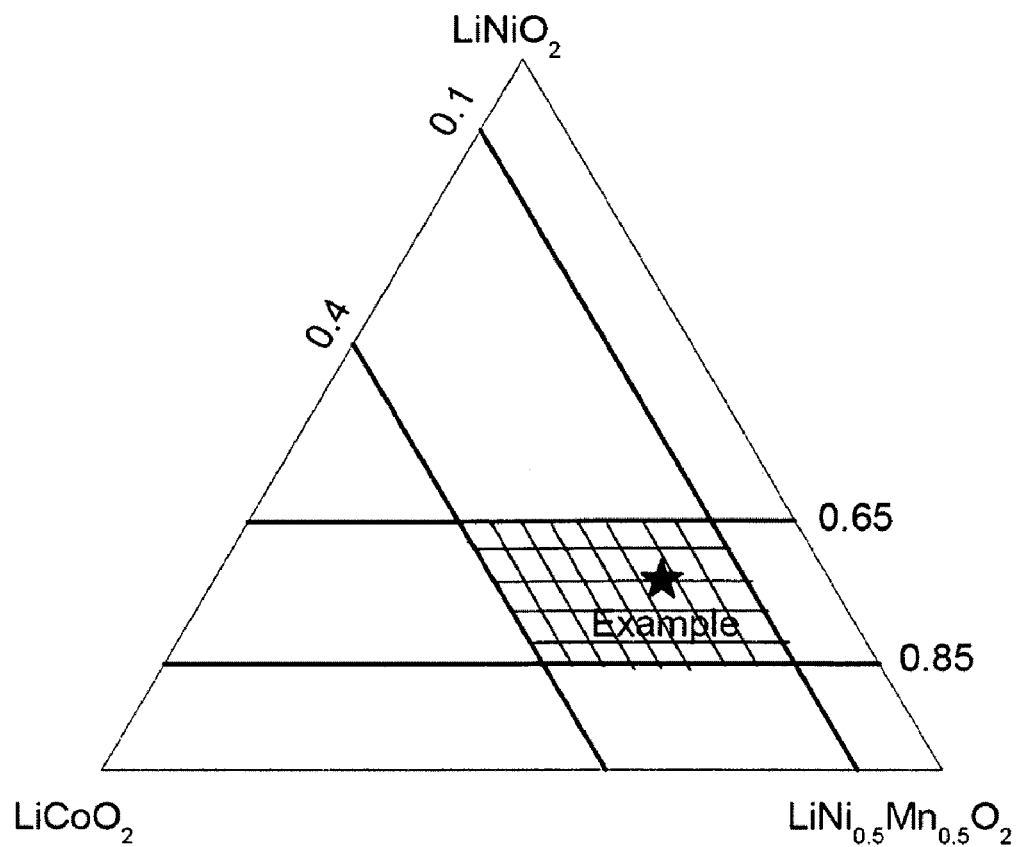
FIG. 1 is a graph showing the preferred composition range of Ni-based lithium transition metal oxide according to the present invention.

According to the present invention, the composition of the lithium transition metal oxide must satisfy the specific conditions as defined in Formula I above, which can be expressed as the below or in FIG. 1.

(i) $Ni_{1-a-b}(Ni_{1/2}Mn_{1/2})_aCo_b$ and 0.65<a+b<0.85

(ii) $0.1 \leq b \leq 0.4$ (iii) x+y=2 and $0.95 \leq x \leq 1.05$

With respect to the condition (i), where the content of 3-valent nickel is excessively high, i.e., a+b<0.65, the doped $LiNiO_2$ cannot be prepared in air on a large scale and $Li_2CO_3$ cannot be used as a precursor (see Comparative Example 2). On the other hand, where the content of 3-valent nickel is excessively low, i.e., a+b>0.85, the doped $LiNiO_2$ can be prepared in air on a large scale and $Li_2CO_3$ can be used as a precursor; however, the volumetric capacity of the doped $LiNiO_2$ thus prepared is not competitive compared to that of $LiCoO_2$ (see Comparative Example 8).

With respect to the condition (ii), where the content of cobalt is excessively high, i.e., b>4.5, the overall cost of raw materials increases because of a high content of cobalt and a slightly lower reversible capacity results. On the other hand, where the content of cobalt is excessively low (b<0.1), it is substantially difficult to achieve a sufficient rate performance and high powder density of batteries at the same time.

With respect to the condition (iii), where the content of lithium is excessively high, i.e., x>1.05, a poor stability is exhibited during cycling at a high voltage (U=4.35 V), particularly at T=60° C. On the other hand, where the content of lithium is excessively low, i.e., x<0.95, a poor rate performance is exhibited and accordingly the reversible capacity is reduced.

As mentioned previously, the lithium transition metal oxide may further contain dopant in a minor amount. Typical dopants are Al, Ti and Mg which are incorporated into the crystal structure. The low doping levels of these dopants (<5%) may be helpful in increasing the general safety and storage and overcharge stability of batteries without significant lowering of reversible capacity. Other dopants known in the art, such as B, Ca, Zr, S, F, P, Bi etc., are not incorporated into the crystal structure but are accumulated at grain boundaries or coat the surface thereof. However, small concentrations of such dopants (<1%) might enhance the stability without lowering the reversible capacity when applied at very low doping levels (<1%). Therefore, various dopants as described above can be applied to the present invention.

The lithium transition metal oxide of the present invention is prepared by solid state reaction in air by an inexpensive process.

The solid state reaction in air proceeds preferably through a two-step heating procedure comprising: (i) a cooking step at a temperature of between 700 and 950° C. under air circulation and then (ii) a sintering step at a temperature of between 850° C. and 1020° C.

As raw materials for the solid state reaction, lithium carbonate ($Li_2CO_3$) and a mixed transition metal precursor are used. $Li_2CO_3$ serves as a source of lithium. The mixed transition metal precursor includes, for example, but is not limited to mixed hydroxides, mixed carbonates and mixed oxides. Herein, "mixed" means that several transition metal elements are well mixed at the atomic level.

One of the features of the present invention is that inexpensive raw materials or materials produced by an economical process can be used, and also $Li_2CO_3$ which is difficult to employ in the prior art is used itself.

MOOH (M=Ni, Mn and Co), as a representative example of the mixed transition metal precursor, has been prepared in the prior art by co-precipitation of $MSO_4$ and NaOH in the presence of excess ammonia as a complexing additive to obtain MOOH having a high density. However, ammonia in waste water causes environmental problems and thus is strictly regulated. On the other hand, MOOH of a relatively low density, which is prepared by a less inexpensive process without using ammonia ('ammonia-free process'), can be employed if the doped $LiNiO_2$ produced therefrom can tolerate stronger sintering conditions (see Example 1).

In conventional processes, $Li_2CO_3$ cannot be used as a raw stock because the decomposition of $Li_2CO_3$ for production of $LiMO_2$ would generate $CO_2$ which decomposes the high-Ni $LiNiO_2$. Moreover, this side reaction occurs even when $Li_2CO_3$ is present as an impurity in precursors of the resulting $LiNiO_2$. On the other hand, in the present invention, these phenomena are not caused in any case where $Li_2CO_3$ is used as a raw stock or contained in precursors. Furthermore, the doped $LiNiO_2$ of the present invention is substantially free of $Li_2CO_3$.

In the present disclosure, pH titration is widely used to find or confirm many experimental results, including the above result. pH titration was performed, for example, in the following manner: 5 g of cathode powder is immersed (soaked) into 25 ml water, and after brief stirring, about 20 ml of clear solution is separated from the powder by decanting, then the clear solution is collected. Again, about 20 ml water is added to the powder, stirred, and collected after decanting. The soaking and decanting is repeated at least 3 more times. By this manner, a total of 100 ml clear solution is collected which contains soluble bases. The content of soluble base is measured by pH titration. While stirring, a flow of 0.1M HCl is added to the solution, and pH as a function of time is recorded. The experiment is finished when the pH reaches a value below pH=3. The flow rate is chosen so that the titration takes about 20~30 minutes. The content of soluble base is given by the amount of acid used to reach pH below 5. The content of soluble base obtained for a given powder in this manner is reproducible, but does depend very weakly on other parameters such as the total soaking time of powder in water. Bases are contributed mainly from two sources: first, impurities such as $Li_2CO_3$ and LiOH present in the $LiNiO_2$; second, base originating from ion exchange at the surface of $LiNiO_2$ ($H^+$ (water)$\leftarrow\rightarrow Li^+$ (surface, outer bulk). The second contribution is typically negligible.

As mentioned previously, the lithium transition metal oxide of the present invention contains substantially no $Li_2CO_3$ impurity and contains only a low content of soluble bases. The level of soluble base content is such that, for example, less than 20 ml of 0.1M HCl is needed to titrate 200 ml of solution to achieve pH below 5, in which the 200 ml solution contains substantially all soluble bases and also is prepared by repeated soaking and decanting of 10 g of the lithium transition metal oxide. It is more preferably less than 10 ml of 0.1M HCl.

In addition, variations due to scale occur in preparation of the doped $LiNiO_2$. Samples of a few grams in a furnace behave very differently from samples of a few kg, because the gas transport kinetics at low partial pressure is very different. Especially in a small-scale process, Li evaporation occurs and $CO_2$ transport is fast, whereas in a large-scale process, these processes are retarded. In this connection, it is noted that the term "large scale" in the present disclosure means a sample size of 5 kg or more because similar behavior is expected in 100 kg of sample when the process has been correctly scaled-up, i.e., a similar gas flow ($m^3$/kg of sample) reaches the sample of 100 kg.

The lithium transition metal oxide of the present invention can be produced preferably through a large-scale process, which is very important in view of practical application. For the solid state reaction in air as mentioned above, air is pumped into or out of a reactor to achieve rapid air circulation in which at least 2 $m^3$ of air (volume at room temperature), preferably at least 10 $m^3$ of air per 1 kg of the final lithium transition metal circulates through the reactor during the reaction.

In an embodiment of the present invention, a heat exchanger is used to pre-warm the in-flowing air before it enters the reactor, while cooling the out-flowing air.

In a preferable embodiment, the solid state reaction occurs by at least two steps, including a cooking step at a temperature between 700 and 950° C. where the transition metal precursor and the $Li_2CO_3$ react to form a $LiMO_2$ precursor, and a sintering step at a temperature between 850 and 1020° C. where the final $LiMO_2$ with a well-layered crystal structure is achieved, in which during the cooking step large quantities of air exceeding 2 $m^3$/kg $LiMO_2$ is fed into the reactor equipped with a heat exchanger to preheat the air.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

DETAILED DESCRIPTION OF PREFERRED EMBODIMENTS

Now, the present invention will be described in more detail with reference to the following Examples. These examples are provided only for illustrating the present invention and should not be construed as limiting the scope and spirit of the present invention.

Comparative Example 1 pH Titration of $Li_2CO_3$ Impurity in Commercial Cathode Materials pH titration was performed for two batches "A" and "B" of the same commercial cathode active materials supplied by the same producer. The composition of cathode materials was given as $Li_{1.05}M_{0.95}O_2$ with M=$(Mn_{1/2}Ni_{1/2})_{0.83}Co_{0.17}$. The cathode material was applied to pilot plant cells. During the high-temperature storage of these cells, cells containing batch "A" evolved unacceptable amounts of gas whereas cells containing batch "B" did not it. Besides this, the batches were identical or very similar in all investigated aspects such as morphology, BET surface area, crystallite size, particle size, reversible capacity, rate performance, crystal structure, lattice parameters, cation mixing, etc.

However, the results of pH titration were very different. For comparison, the pH profile of a commercial sample "C" with the composition of $LiNi_{1/3}Mn_{1/3}Co_{1/3}O_2$ was also measured because pilot plant cells containing this sample showed an exceptionally low gas evolution. The result of the pH titration experiments is provided in FIG. 2.

Figure 2:
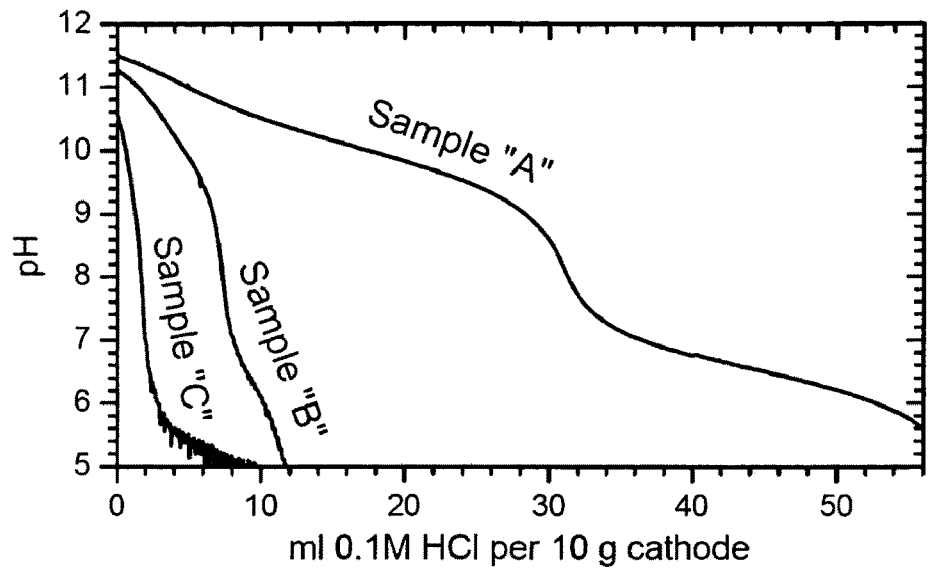
FIG. 2 is a graph showing the pH titration of soluble bases from commercial cathode materials in Comparative Example 1.
Figure 3:
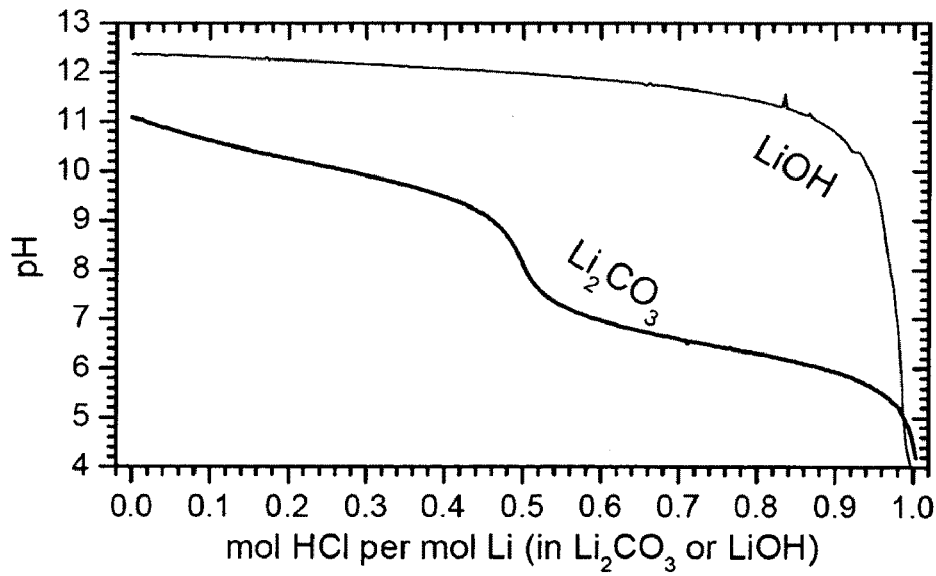
FIG. 3 is a graph showing the standard pH titration of soluble bases from $LiOH*H_2O$ and Li2CO3.

Referring to FIG. 2, Sample "A" showing a strong gas evolution contained an excessive quantity of soluble base. Sample "C" having an exceptional stability was substantially free of soluble base. From the shape of the pH titration profile, the character of the soluble base can be obtained. With reference to FIG. 3, $Li_2CO_3$ shows two plateaus, whereas LiOH has only a single plateau at high pH. Therefore, the soluble base of sample "A" is identified to be mainly $Li_2CO_3$. Sample "B" contained a small amount of $Li_2CO_3$-type base and a still smaller amount of LiOH-type base, probably originating from molecules on the surface or from the ion exchange reaction between water and lithium present in the outermost region of cathode particles.

Knowledge about the content of soluble bases is a powerful tool to guide the development of cathodes with improved storage stability. It is, however, important to measure the pH profile in order to characterize which soluble bases are present. Only measuring pH, for example, as described in EP 1 317 008 A2 (S. Miasaki, Sanyo) is not recommendable because even a small amount of LiOH-type impurity (which is quite harmless) can give a higher pH than that obtained for a significant and harmful $Li_2CO_3$ impurity.

Therefore, this experiment clearly shows the usefulness of pH titration to obtain information about the content of soluble bases.

Comparative Example 2

Thermodynamic Stability of Commercial High-Ni $LiNiO_2$

In this experiment, the thermodynamic stability of commercial $LiNiO_2$ was investigated. The sample had the composition of $LiNi_{0.8}Co_{0.1}Mn_{0.1}O_2$ which may be alternatively expressed as $LiNi_{1-x}M_xO_2$ with x=0.3, i.e., M=$Mn_{1/3}Ni_{1/3}Co_{1/3}$.

The thermodynamic stability was measured by heating the above cathode material in air. 50 g of each sample was heated to each of 500° C. (48 h), 750° C., 800° C., 850° C., 900° C. and 950° C. (36 h). X-ray analysis was performed to obtain detailed lattice parameters with high resolution. The cation mixing was obtained by Rietveld refinement. Morphology was investigated by field emission electron microscopy (FESEM).

The X-ray analysis showed the continuous deterioration of crystal structure (increase of cation mixing, increase of lattice constant, and lowering of c:a ratio) for all samples heated to T>750° C. The high-Ni LiNiO2 decomposes in air containing trace CO2 with reduction of 3-valent Ni according to the below scheme.

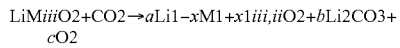
$$LiM_{iii}O2 + CO2 \rightarrow aLi1-xM1+x1_{iii,ii}O2 + bLi2CO3 + cO2$$

In this procedure, the increase of Li2CO3 impurity was ascertained by pH titration.

Figure 4:
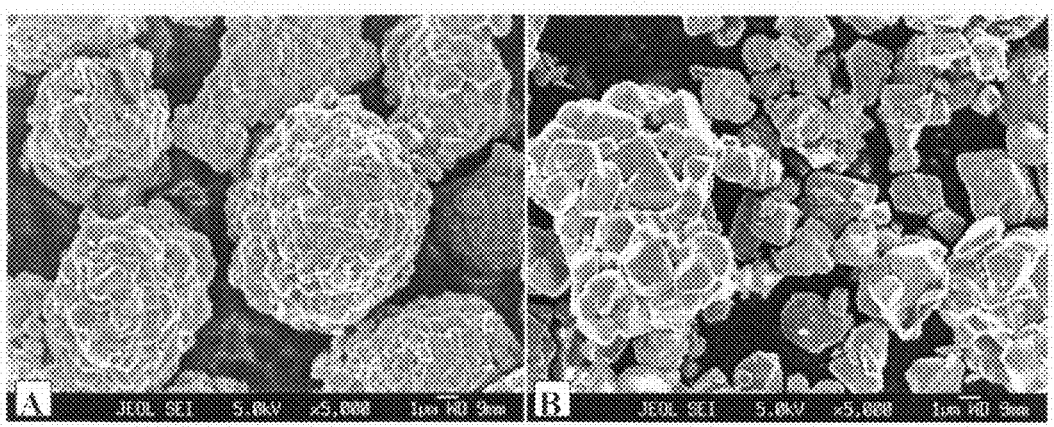
FIG. 4 is FESEM micrographs of commercial high-Ni LiNiO2 in Comparative Example 2 in which (A) is the FESEM of sample as received and (B) is the FESEM of sample after heating to 850° C. in air.

In FIG. 4, a micrograph of the commercial sample as received is compared with that of the same sample heated to 850° C. Referring to FIG. 4, the sample heated to T≧850° C. has disintegrated. In an additional experiment, a full disintegration of secondary particles into single primary crystallites was observed at 900° C.

In summary, the commercial LiNiO2 cathode materials are thermodynamically unstable during heating in air. More specifically, Li2CO3 forms and the molten Li2CO3 separates the grains so that primary particles lose contact and the secondary particles collapse. Accordingly, it is impossible to prepare Li—Ni-oxides with a high Ni content, i.e., LiNi1–xMxO2 with x≧0.7 in air due to the thermodynamic limitation, where the air contains trace CO2 at a sufficiently high partial pressure. It is also ascertained in this experiment that Li2CO3 cannot be used as a precursor in conventional processes, because the decomposition of Li2CO3 for formation of LiMO2 gives CO2, which would kinetically hinder a further decomposition even at a low partial pressure.

Comparative Example 3

Li$_2$CO$_3$ Impurity in Commercial High-Ni LiNiO$_2$

In this experiment, it was investigated whether the stoichiometric and impurity-free high-Ni LiNiO2 can be obtained on a large scale by a simple process involving solid state reaction in oxygen.

In prior art processes, as precursors for preparation of LiNiO2-based cathode, LiOH*H2O and Ni-based transition metal hydroxide are generally employed. However, both precursors commonly contain carbonate impurities. The technical grade LiOH*H2O typically contains >1% Li2CO3 impurity, and Ni(OH)2 also contains CO3 anion because it is prepared by co-precipitation of a Ni-based salt such as NiSO4 with a base such as NaOH in which the technical grade NaOH contains Na2CO3 and the CO3 anion is more preferably inserted into the Ni(OH)2 structure than the OH anion.

When cooking a mixture of these precursors in oxygen, the lithium hydroxide and transition metal hydroxide react to form Li1–xM1+xO2, but all carbonate impurity is trapped as Li2CO3 impurity. The Li2CO3 impurity does not decompose at a sufficient rate during further cooking in oxygen, and the stoichiometric high-Ni LiNiO2 is very unstable at 800° C. As a result, no Li2CO3 decomposes but Li2O additionally forms, as will be described in below.

Figure 5:
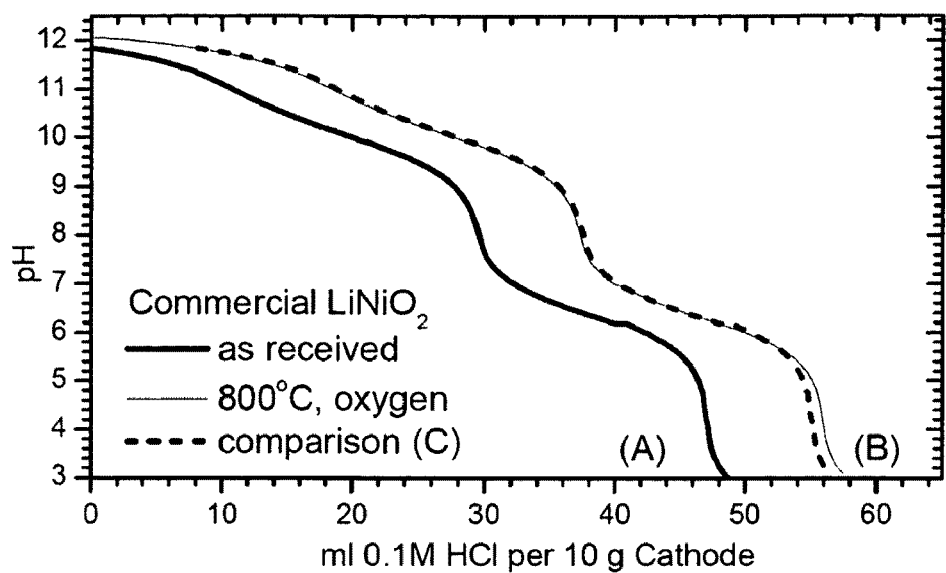
FIG. 5 is a graph showing the standard pH titration of commercial high-Ni LiNiO2 in Comparative Example 3 in which (A) is for the sample as received, (B) is for the sample after heating to 800° C. in oxygen atmosphere, and (C) is for a control group.

In this regard, the pH titration of commercial high-Ni LiNiO2 of which the composition is LiNi0.8Co0.2O2 is shown in FIG. 5. Curve (A) in this drawing shows the pH titration of the LiNi0.8Co0.2O2 as received, and Curve (B) after heating to 800° C. for 24 hours in a flow of pure oxygen. Curve (C) is a copy of curve (A) and allows to better display the similarity of the shapes of curve (A) and (B). Flow rate was >2 l/min and the sample was 400 g. The analysis of the pH profile shows that the contents of Li2CO3 before and after heat treatment are identical. Apparently, the Li2CO3 impurity did not react at all, whereas a small amount of Li2O has formed (The corresponding slight decrease of Li content in the LiNiO2 crystal structure was confirmed by the observation of a slight increase of cation mixing, slight decrease of c:a ratio and slight decrease of unit cell volume obtained from X-ray analysis).

It can be concluded that conventional methods (heating of Ni(OH)2 and LiOH*H2O) in a "normal" flow of oxygen gas or synthetic air do not achieve stoichiometric and impurity-free LiNiO2 on a large scale. Herein, the "normal" flow means a flow of less than about 1 m3 gas fed into the reactor per kg of cathode material during the reaction. Either when the LiNiO2 contains a significant Li2CO3 impurity, or when the Li2CO3 impurity is avoided, the LiNiO2 will necessarily become lithium deficient (i.e., cation mixed) Li1–xNi1+xO2. This is because the equilibrium partial pressure of CO2 for Li2CO3 coexisting with $Li_{1-x}Ni_{1+x}O2$ strongly increases with "x"; therefore, the reaction towards stoichiometric LiNiO2 is kinetically limited by the poor gas transport kinetics of CO2 at low pressure. Only if Li is sufficiently deficient, i.e., "x" is sufficiently large, does the higher CO2 equilibrium partial pressure allow for a significant transport of CO2 away from the sample so that Li2CO3 (originating from CO3 anion impurities of the precursors) effectively decomposes. Alternatively, modification of the prior art processes, for example, by pumping much larger flows of oxygen or synthetic air at lower cooking temperature, would increase the process cost. An intermediary washing procedure, which would effectively remove unreacted Li2CO3, followed by heat treatment, would also significantly increase the process cost.

Comparative Example 4

Air Stability of Commercial High-Ni LiNiO$_2$

Figure 6:
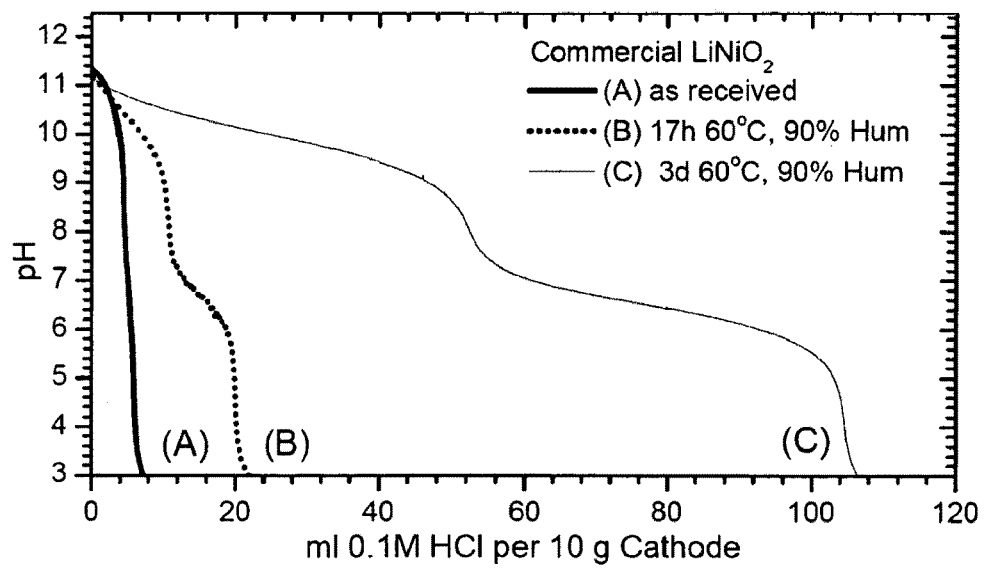
FIG. 6 is a graph showing the decomposition rate of commercial high-Ni LiNiO2 during air storage in a 90% humidity chamber at 60° C. by pH titration in Comparative Example 4 in which (A) is for the sample as received, (B) is for the sample after 17-hours storage in the humidity chamber, (C) is for the sample after 3 days storage in the humidity chamber.

The pH titration result of commercial high-Ni LiNiO$_2$ before and after exposure to humid air is shown in FIG. 6. The commercial LiNiO$_2$ is LiAl$_{0.02}$Ni$_{0.78}$Co$_{0.2}$O$_2$, additionally containing less than 1% of barium compounds, and the results of FIG. 6 show that the amount of soluble base before storage is exceptionally low. It is expected that the producer has prepared the sample in oxygen, either from extremely pure (i.e., CO$_3$ anion-free) precursors or by applying at least two cooking steps, interrupted by a washing procedure to remove Li$_2$CO$_3$ and LiOH impurities. Barium is probably added to trap the remaining CO$_3$ anions by forming the highly stable BaCO$_3$. This manner is a high-cost process.

Upon air exposure, a significant amount of soluble base, mainly Li$_2$CO$_3$ type, continuously forms. The result shows that commercial LiNiO$_2$, even if the initial content of Li$_2$CO$_3$ impurity is low, is not stable in air and decomposes at a significant rate, and a significant amount of Li$_2$CO$_3$ impurity is formed during storage.

Comparative Example 5

Air Stability of Commercial Coated High-Ni LiNiO$_2$

Another commercial high-Ni LiNiO$_2$ sample with the composition of LiNi$_{0.8}$Mn$_{0.05}$Co$_{0.15}$O$_2$ was tested. The preparation process of the sample includes a surface coating by AlPO$_4$, followed by a mild heat treatment, and this is a high cost process. The coating is probably a dip-coating process, having the side effect that excess Li$_2$CO$_3$ is dissolved. Furthermore, during the heat treatment, AlPO$_4$ reacts with excess lithium so that Li$_3$PO$_4$ and Al$_2$O$_3$ (or LiAlO$_2$) can form. Therefore, the sample has a low content of Li$_2$CO$_3$ and the surface of the cathode material is lithium-deficient. The experimental results confirmed a reduced swelling property in polymer cells. By the pH titration result, a low initial $Li_2CO_3$ content (12 ml 0.1M HCl per 10 g cathode) was ascertained. The profile was very similar to that of the fresh sample of Comparative Example 4, Curve (A). Two more pH profiles were recorded after storage in a humidity chamber similar to Comparative Example 4. Only a slightly lower formation rate of $Li_2CO_3$ (80~90%) compared with Comparative Example 4 was observed.

These results show that the coating of high-Ni $LiNiO_2$ does not improve its stability during storage in air. Furthermore, electrochemical properties such as the cycling stability and rate performance were poor, which was possibly caused by the lithium-deficient surface.

Comparative Example 6

Safety of Commercial High-Ni $LiNiO_2$

Figure 7:
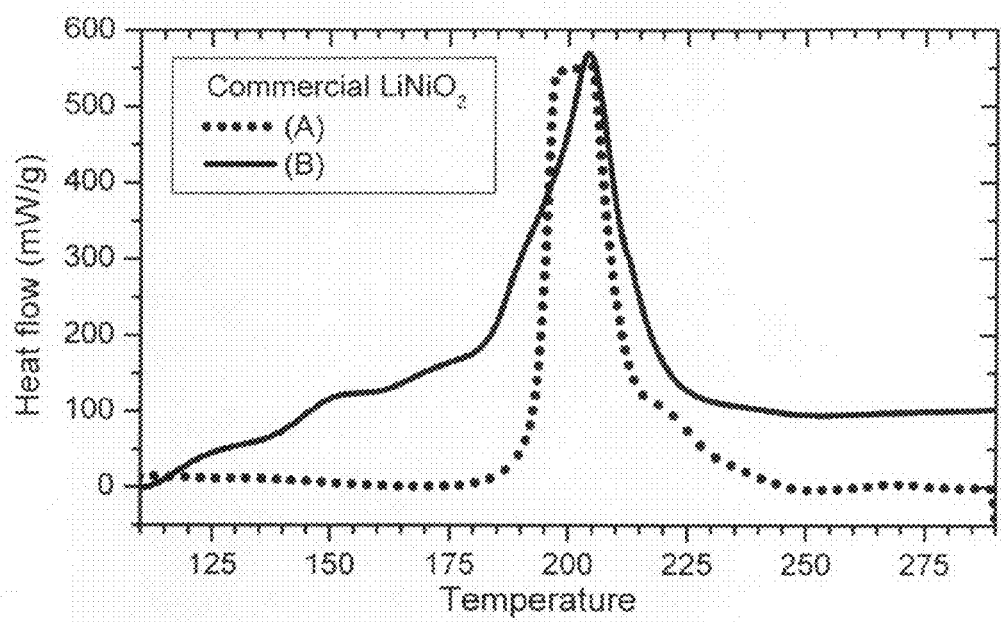
FIG. 7 is a graph showing the DCS measurements, of the samples from Comparative Example 6 in which (A) is for the commercial Al/Ba-modified LiNiO2 and (B) is for the commercial AlPO4-coated LiNiO2; where the DCS combustion test is a measure of the safety of the specimen and its stability to storage.

The result of DSC measurement is shown in FIG. 7. For the measurement, coin cells (Li metal anode) with $LiNiO_2$ cathodes were charged to 4.3 V, and after disassembly they were inserted into hermetically sealed DSC cans, and electrolyte was poured thereinto. The total amount of cathode was about 50~60 mg and the amount of electrolyte was approximately the same. As such, the exothermic reaction is strongly cathode-limited (only a fraction of the electrolyte can be fully combusted by all oxygen of the cathode). The DSC measurement was performed at a heat rate of 0.5 K/min.

Referring to FIG. 7, in both (A) Al/Ba-modified $LiNiO_2$ and (B) $AlPO_4$-coated $LiNiO_2$, a strong exothermic reaction starts at relatively low temperatures. In the case (A), the heat evolution exceeds the limit of the device. The total integrated amount of evolved heat is large, well above 2000 kJ/g, indicating the poor safety of commercial high-Ni $LiNiO_2$.

Although further attempts to improve the performance of high-Ni $LiNiO_2$ are disclosed in many prior art literatures and patents, these methods are expensive and the results are usually insufficient. Alternatively, encapsulation of high Ni—$LiNiO_2$ by SiOX protective coating has been proposed (H. Omanda, T. Brousse, C. Marhic, and D. M. Schleich, J. Electrochem. Soc. 151, A922, 2004), but the resulting electrochemical properties are very poor. In this connection, the inventors of the present invention have investigated the encapsulation by $LiPO_3$ glass. Even where a complete coverage of the particle is accomplished, a significant improvement of air-stability could not be made and electrochemical properties were poor.

Comparative Example 7

Electrochemical Properties of Commercial High-Ni $LiNiO_2$

In Table 1 below, the results of electrochemical testing of different commercial high-Ni $LiNiO_2$ materials are summarized. The testing was performed at 60° C. at C/5 charge and discharge rate. The charge voltage was 4.3 V. Referring to Table 1, with the exception of Sample (B), the cycling stability is poor. The poor cycling stability of Sample (C) is probably caused by the Li-deficiency of the surface (the poor capacity retention of cation-mixed (i.e., Li-deficient) lithium nickel oxides is known in the prior art literatures). Both Samples (A) and (B) are stoichiometric (i.e., not Li-deficient), but only Sample (B) has a low content of $Li_2CO_3$. The presence of $Li_2CO_3$ may not only cause gassing but also fading (Probably at 4.3 V, $Li_2CO_3$ slowly decomposes and the crystallites lose electrical contact).

Therefore, the problems of safety, poor air stability, high $Li_2CO_3$ impurity level and high processing cost have not been solved in the prior art processes.

TABLE 1

| | Electrochemical properties of high Ni—$LiNiO_2$ (60° C., C/5-C/5, 3.0-4.3 V) | | |
|---|---|---|---|
| Described in | (A) $LiNi_{0.8}Co_{0.2}O_2$ Comp. Ex. 3 | (B) Al/Ba-modified Comp. Ex. 4 | (C) $AlPO_4$-coated Comp. Ex. 5 |
| Stoichiometry Li:M | Stoichiometric high | Stoichiometric low | Surface Li deficient low |
| $Li_2CO_3$ impurity | | | |
| Capacity at 25° C. C/10, C/1 | 193, 175 mAh/g | 195, 175 mAh/g | 185, 155 mAh/g |
| Capacity loss | 30% per 100 cycles | 11% per 100 cycles | >30% per 100 cycles |

Comparative Example 8

Volumetric Capacity of Commercial Low-Ni $LiNiO_2$

Commercial $LiMO_2$ with $M=(Ni_{1/2}Mn_{1/2})_{1-x}Co_x$ with $x=0.17$ and with $x=0.33$, respectively, were tested. The crystallographic densities thereof were approx. 4.7 and 4.76 g/cm$^3$, respectively. A discharge capacity of 157~159 mAh/g at C/10 rate (3~4.3 V) was obtained for both materials.

The crystallographic density of $LiCoO_2$ is 5.04 g/cm$^3$ and the discharge capacity is 157 mAh/g. The volumetric capacity of the cathode with $x=0.17$ corresponds to only 93% of the density of $LiCoO_2$ and the density of the cathode with $x=0.33$ corresponds to only 94%. Accordingly, it is ascertained that materials with low Ni content have a poor volumetric capacity.

Example 1

Sintering Stability

A mixed hydroxide MOOH with $M=Ni_{4/15}(Mn_{1/2}Ni_{1/2})_{8/15}Co_{0.2}$ was used as the transition metal precursors for preparation of nickel-based $LiMO_2$. The transition metal composition of the final $LiMO_2$ is marked as an asterik in FIG. 1. An intermediary sample was prepared by mixing the mixed hydroxide and $Li_2CO_3$ (stoichiometric ratio Li:M=1.02:1) and heating the resulting mixture to 700° C. in air. Samples (each approx. 50 g) of the intermediary sample were then sintered for 15 hours at various temperatures from 700 to 1000° C. in normal air. An improved sintering stability was observed at all of the temperatures. Secondary particles were maintained intact, and no disintegration into single crystallites as observed in Comparative Example 2 was observed. The size of crystallites increased with the sintering temperature.

Figure 8:
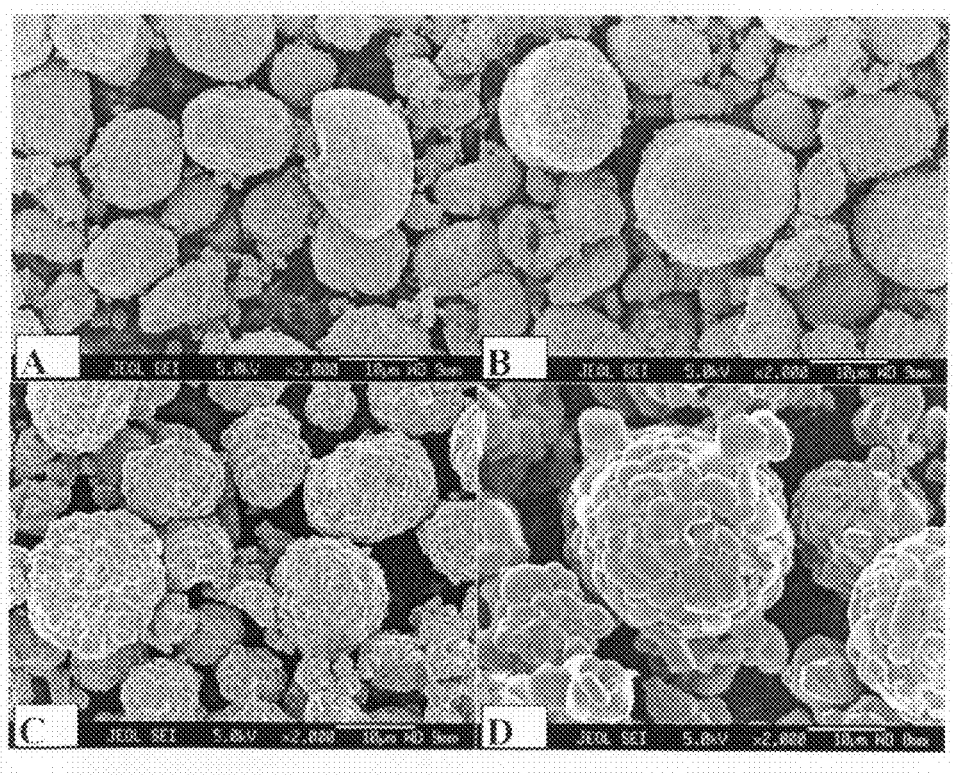
FIG. 8 is FESEM micrographs (×2000) of the sintered nickel-based LiMO2 of Example 1: A) 850° C., (B) 900° C., (C) 950° C. (D) 1000° C.

X-ray analysis showed that all samples have a well-layered crystal structure. The unit cell volume did not change significantly with increase of sintering temperature, which proves that no significant oxygen deficiency, no significant increase of cation mixing and essentially no Li evaporation occurred. The best electrochemical properties were obtained in samples sintered around 900° C., having a preferred BET surface area of about 0.4~0.8 m²/g. The obtained crystallographic data are provided in Table 2 below, and FESEM micrographs in FIG. 8.

This experiment shows that despite the use of $Li_2CO_3$ and sintering in air, well-layered, stoichiometric $LiMO_2$ can be made, and furthermore an excellent sintering stability in air can be obtained.

TABLE 2

| | Crystallographic data | | | |
|---|---|---|---|---|
| | Sintering temperature | | | |
| | (A) 850° C. | (B) 900° C. | (C) 950° C. | (D) 1000° C. |
| Unit cell volume | 33.902 Å³ | 33.905 Å³ | 33.934 Å³ | 33.957 Å³ |
| Normalized c:a ratio c:a /24^0.5 | 1.0123 | 1.0124 | 1.0120 | 1.0117 |
| Cation mixing from Rietveld refinement | 4.5% | 3.9% | 4.3% | 4.5% |

Comparative Example 9

Sintering Stability of High Co Samples

Mixed hydroxide MOOH with $M=Ni_{0.25}(Mn_{1/2}Ni_{1/2})_{1/3}Co_{5/12}$ was used as a precursor. The amount of 3-valent Ni in $LiMO_2$ was almost identical to that in Example 1. The same investigation as in Example 1 was performed. Samples could be sintered in air with basically no disintegration being observed. Crystallographic data are summarized in Table 3 below. Apparently, the sintering stability is rather similar to that of $LiNiO_2$ ($M=Ni_{4/15}(Mn_{1/2}Ni_{1/2})_{8/15}Co_{0.2}$ produced in Example 1. It was expected that the high Co content would hinder cation mixing; however, the cation mixing was surprisingly similar or greater.

Unfortunately, high cobalt-content samples are more expensive due to high prices of cobalt as a raw material. Moreover, the additional electrochemical test showed slightly lower reversible capacities in comparison with that of Example 1. Therefore, the composition range, not being too rich in cobalt, as sketched in FIG. 1, is a preferable region for the present invention.

TABLE 3

| | Crystallographic data | | |
|---|---|---|---|
| | Sintering temperature | | |
| | (A) 900° C. | (B) 950° C. | (C) 1000° C. |
| Unit cell volume | 33.445 Å³ | 33.457 Å³ | 33.514 Å³ |
| Normalized c:a ratio c:a /24^0.5 | 1.0144 | 1.0142 | 1.0154 |
| Cation mixing from Rietveld refinement | 3.3% | 6.3% | 6.6% |

Example 2

Li Stoichiometric Range

Samples with different Li:M ratios were prepared from MOOH with $M=Ni_{4/15}(Mn_{1/2}Ni_{1/2})_{8/15}Co_{0.2}$. $Li_2CO_3$ was used as a lithium source. 7 samples each of about 50 g with Li:M ratios ranging from 0.925 to 1.12 were prepared through two steps. The samples were first cooked at 700° C., followed by sintering at 910~920° C. All heat treatments were carried out in normal air. Then, electrochemical properties were tested.

Figure 9:
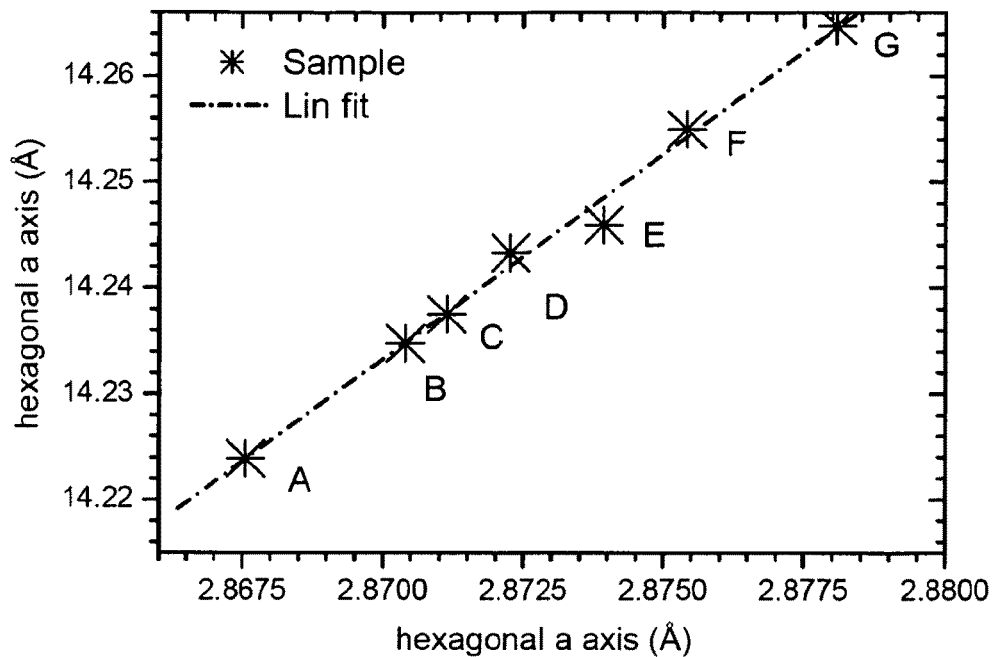
FIG. 9 is a crystallographic map of the samples with different Li:M ratios in Example 2.
Figure 10:
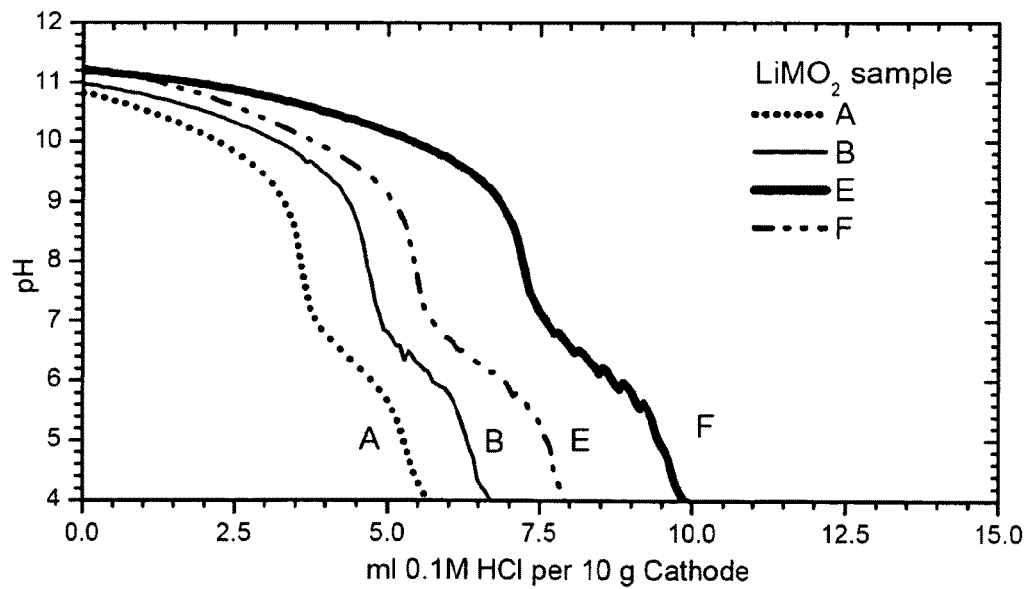
FIG. 10 shows the pH titration of the samples with different Li:M ratio in Example 2.

Table 4 below provides the obtained crystallographic data. The unit cell volume changes smoothly according to the Li:M ratio. FIG. 9 shows its crystallographic map. All samples are located on a straight line. FIG. 10 shows the results of pH titration. The content of soluble base increases slightly with the Li:M ratio. However, the total amount of soluble base is small. The soluble base probably originates from the surface basicity (ion exchange) but not from the dissolution of $Li_2CO_3$ impurity as observed in Comparative Example 1. This experiment clearly shows that the cathode material is in the Li stoichiometric range and additional Li is inserted into the crystal structure. Therefore, $Li_2CO_3$ does not coexist as second phase and hence stoichiometric samples without $Li_2CO_3$ impurity can be obtained even when $Li_2CO_3$ is used as a precursor and the sintering is carried out in air.

TABLE 4

| | Crystallographic data | | | | | | |
|---|---|---|---|---|---|---|---|
| Sample | A | B | C | D | E | F | G |
| Desired Li:M ratio | 0.925 | 0.975 | 1.0 | 1.025 | 1.05 | 1.075 | 1.125 |
| Unit cell volume | 34.110 Å³ | 34.023 Å³ | 33.968 Å³ | 33.921 Å³ | 33.882 Å³ | 33.857 Å³ | 33.764 Å³ |
| c:a ratio | 1.0117 | 1.0119 | 1.0119 | 1.0122 | 1.0122 | 1.0123 | 1.0125 |
| Cation mixing | 8.8% | 6.6% | 6.7% | 4.0% | 2.1% | 2.5% | 1.4% |

Example 3

Large-Scale Sample Prepared in Air Using $Li_2CO_3$

Approx. 5 kg of $LiMO_2$ was prepared in one batch. Precursors were $Li_2CO_3$ and a mixed hydroxide MOOH with $M=Ni_{4/15}(Mn_{1/2}Ni_{1/2})_{8/15}Co_{0.2}$. The preparation process involved 3 cooking steps. By heating to 700° C., a precursor with a Li:M ratio of approx. 1:1 was prepared. The furnace was a chamber furnace of about 20 liter volume; the sample was located in a tray of high-temperature steel. This precursor was sintered at 900° C. for 10 hours. During the sintering, air was pumped into the furnace. More than 10 $m^3$ of air was fed into the oven during sintering for 10 hours. After the sintering, the unit cell constant was obtained by X-ray analysis, and the unit cell volume was compared with the target value. The target value was the unit cell volume of the sample in Example 2 which had the best electrochemical properties. pH titration of the sintered sample showed a profile very similar to that of Sample (E) in Example 2, which proves that the 5 kg sample was basically free of $Li_2CO_3$ impurity. A small amount of $Li_2CO_3$ was added to ensure that the targeted unit cell volume is achieved after the final sintering. The final cooking was performed in air at 900° C.

Figure 11:
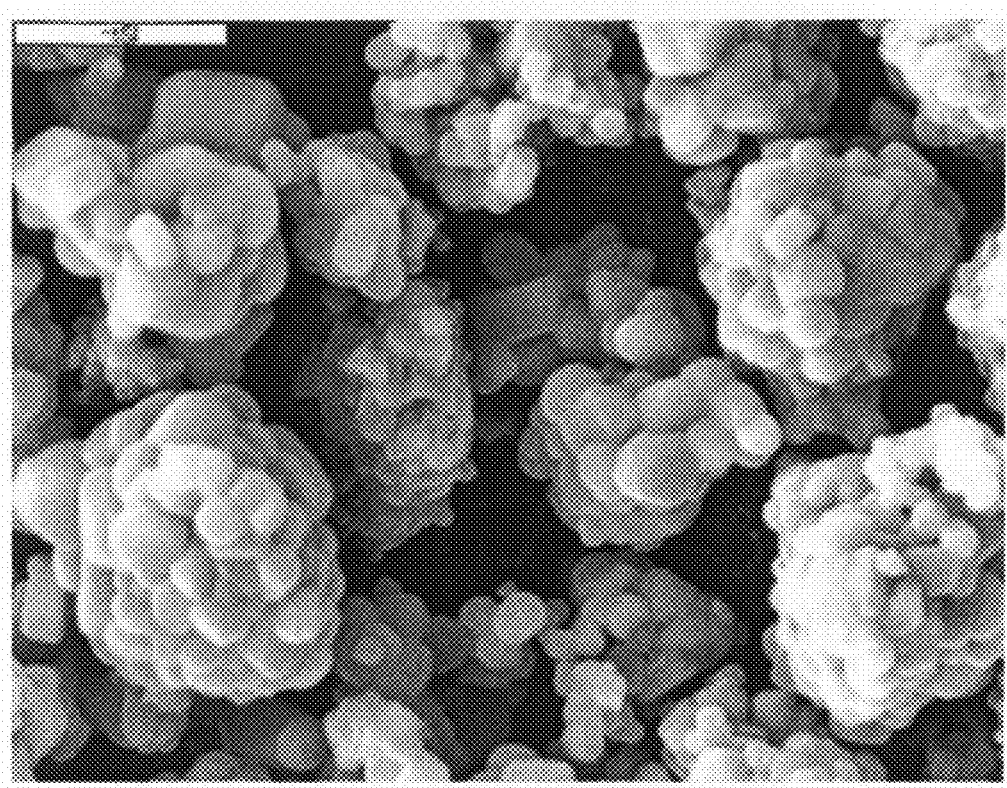
FIG. 11 is SEM micrographs of the cathode active material in Example 3.
Figure 12:
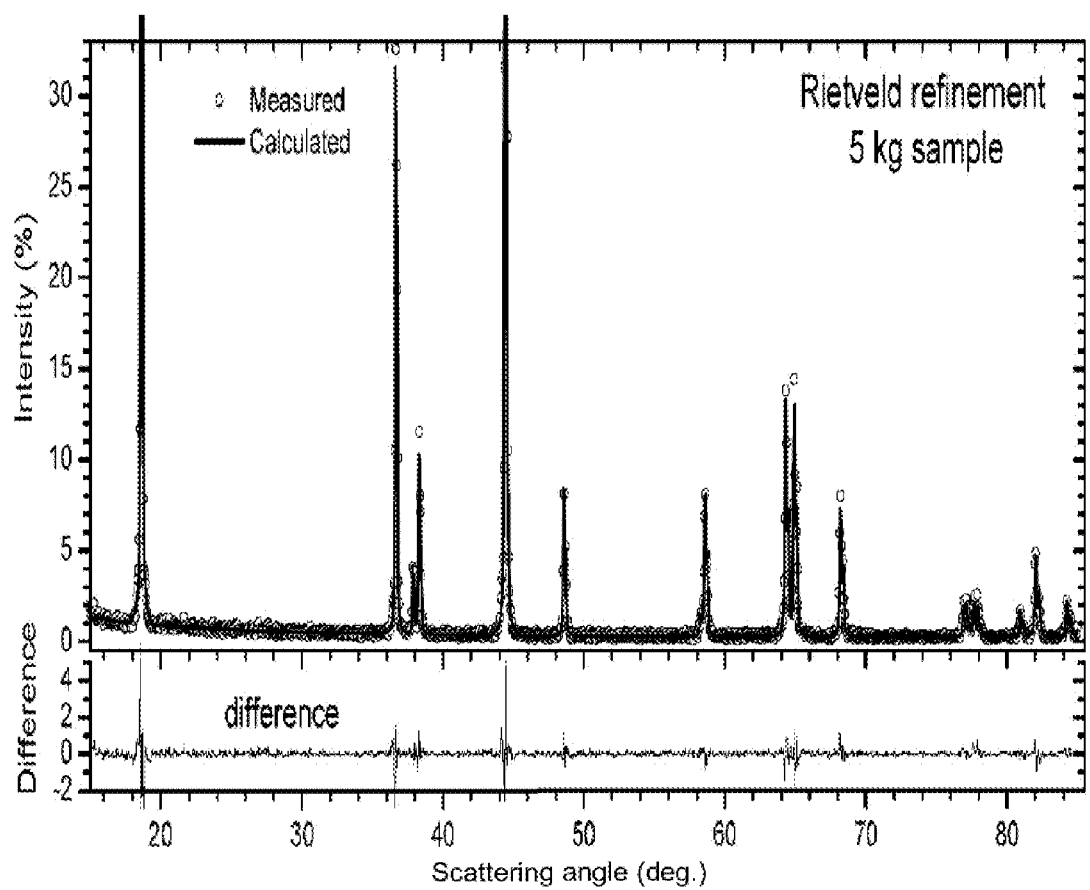
FIG. 12 shows the Rietveld refinement of the X-ray diffraction pattern of the sample in Example 3.

By ICP analysis, it was confirmed that the final stoichiometric ratio of Li and M was very near to 1.00. The unit cell volume was within the targeted region. FIG. 11 discloses the SEM micrographs of the obtained cathode material and FIG. 12 shows a Rietveld refinement. Referring to these drawings, the sample has a high crystallinity and is well layered. pH titration confirmed that $Li_2CO_3$ impurity is not present. Less than 10 ml of 0.1M HCl was needed to titrate 10 g cathode to pH below 5, which corresponds to a content of $Li_2CO_3$ impurity of about 0.2% by weight or less.

As a result, this experiment shows that large-scale samples of stoichiometric $LiMO_2$ with $M=Ni_{4/15}(Mn_{1/2}Ni_{1/2})_{8/15}Co_{0.2}$, free of $Li_2CO_3$ impurity, can be obtained from mixed hydroxide and $Li_2CO_3$ by solid state reaction. It is, however, required to support gas transport by pumping normal air into the furnace.

Comparative Example 10

No Air Pumping

More than 5 kg $LiMO_2$ were prepared in the same manner as Example 3 with the exception that no air was pumped into the chamber furnace during sintering. Limited air circulation was still possible through an opening of about 10 cm diameter in the door of the furnace. After sintering, the unit cell volume was obtained by X-ray analysis. The unit cell volume was slightly less than target, indicating that the $LiMO_2$ phase is slightly Li-deficient, which was confirmed by pH titration. More specifically, more than 50 ml of 0.1M HCl was required to titrate the sample to pH below 5, corresponding to a significant amount of $Li_2CO_3$ impurity of about 1% by weight.

As a result, this experiment shows that the natural circulation of air is not sufficient and the absence of the artificial air flow results in an incomplete reaction so that unreacted $Li_2CO_3$ may remain as impurities.

Example 4

Heat Exchanger

Pumping air into a large-scale reactor at T=800~900° C. consumes significant additional energy in the case where the hot air is released to the environment after reaction. Air flow of at least 2 $m^3$, preferably at least 10 $m^3$ per kg of sample is required. 2 $m^3$ corresponds to about 1.5 kg at 25° C. The heat capacity of air is about 1 kJ/kg° K and the temperature difference is about 800K. Thus, at least about 0.33 kWh is required per kg of the final sample for air heating. Where the air flow is 10 $m^3$, about 2 kWh is then necessary. Thus, the typical additional energy cost amounts to about 2~10% of the total cathode sales price. The additional energy cost can be significantly lowered where the air-exchange is made by using a heat exchanger. The use of a heat exchanger also reduces the temperature gradient in the reactor. To further decrease the temperature gradient, it is recommended to provide several air flows into the reactor simultaneously.

Example 5

Coin cell testing of Large-Scale Sample

Stoichiometric LiMO2 with $M=Ni_{4/15}(Mn_{1/2}Ni_{1/2})_{8/15}Co_{0.2}$, basically free of $Li_2CO_3$ impurity, such as $LiMO_2$ disclosed in Example 3, was electrochemically tested in the form of coin cell in which Li metal was used as an anode. Cycling was performed between 3 and 4.3 V, mainly with C/5 charge and C/5 discharge rate (1 C=150 mA/g) at 25° C. and 60° C. In comparison with the high-Ni $LiNiO_2$ cathode materials of Comparative Example 7, a further improved cycling stability was observed. The crystallographic density of the Ni-based $LiMO_2$ was 4.74 $g/cm^3$ ($LiCoO_2$: 5.05 $g/cm^3$). The discharge capacity was more than 170 mAh/g at C/20 ($LiCoO_2$: 157 mAh/g). As a result, the volumetric capacity exceeds that of $LiCoO_2$. This is a further significant improvement over the low-Ni cathode materials of Comparative Example 8.

Figure 13:
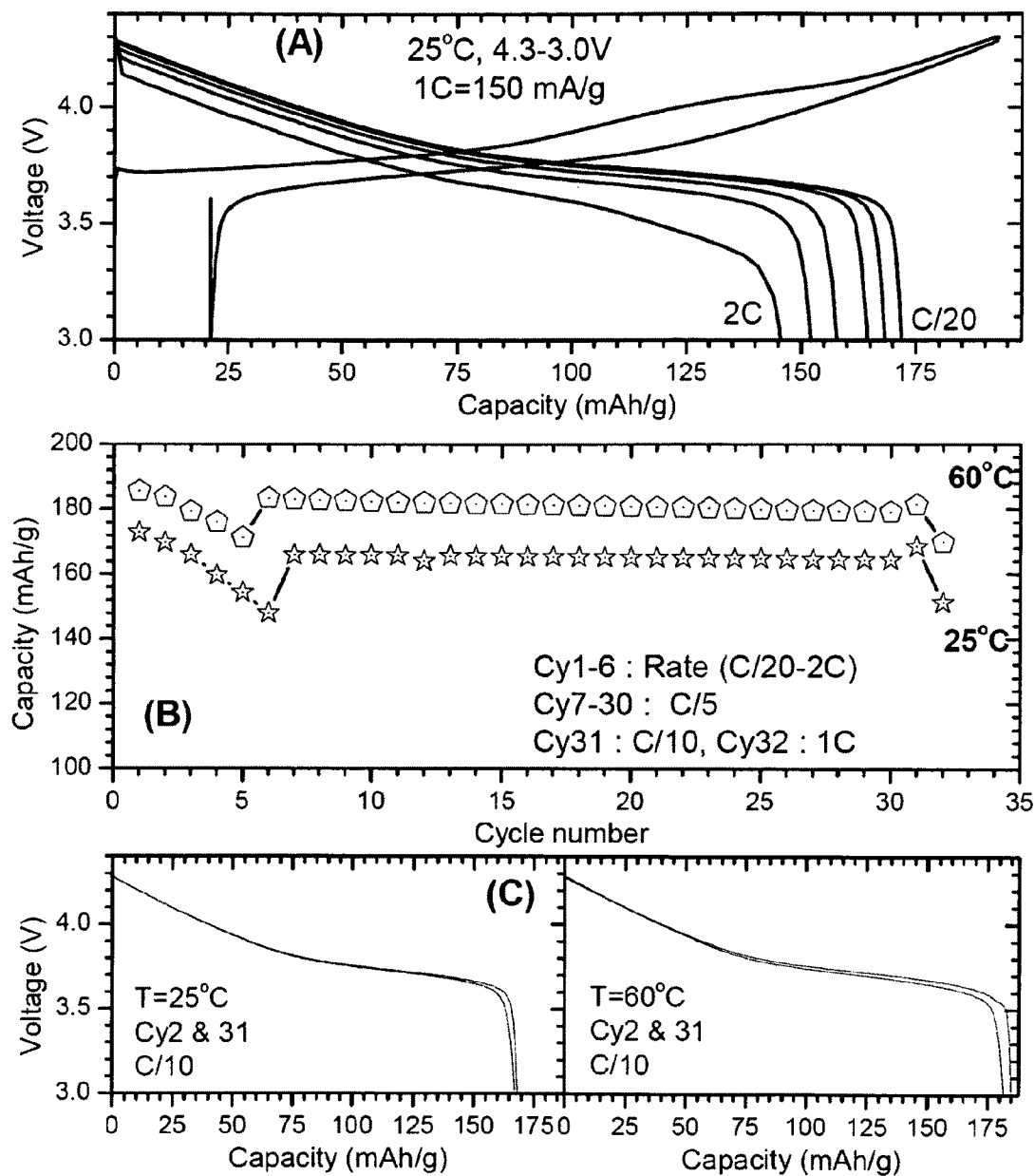
FIG. 13 is graphs showing the electrochemical properties of nickel-based LiMO2 prepared in air using Li2CO3 in Example 5 in which (A) is a graph showing the voltage profile and rate performance at room temperature (cycle 1-7), (B) is a graph showing the cycling stability (3.0-4.3V) at C/5 rate at 25° C. and at 60° C., (C) is a graph showing the discharge profile (C/10 rate) of cycle 2 and cycle 31 obtained during 25° C. and 60° C. cycling.

In Table 4 below, the obtained electrochemical results are summarized. In FIG. 13, the obtained voltage profile, discharge curves and cycling stability are disclosed.

TABLE 4

| Electrochemical properties of $LiNiO_2$ | | | | | |
|---|---|---|---|---|---|
| Capacity retention (extrapolated) after 100 cycles C/5-C/5 cycling, 3.0-4.3 V | | $1^{st}$ charge capacity | discharge capacity | | |
| 25° C. | 60° C. | 3.0-4.3 V, C/10 | 25° C., C/1 | 25° C., C/20 | 60° C., C/20 |
| >96% | >90% | >190 mAh/g | 152 mA/g | 173 mAh/g | 185 mAh/g |

Example 6

DSC of Large-Scale Sample

Figure 14:
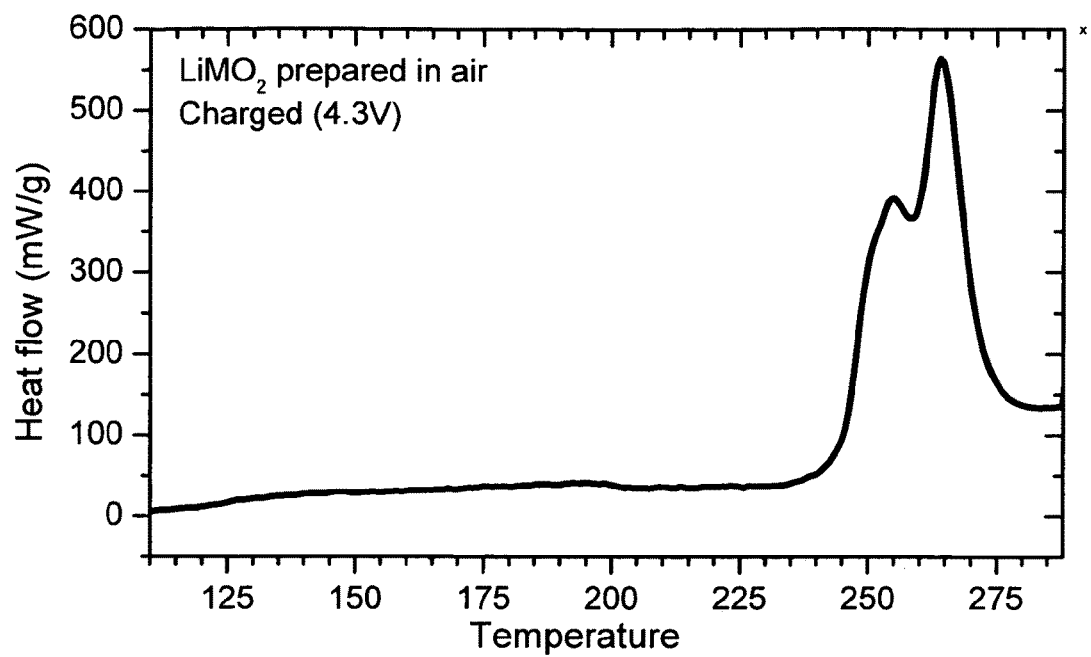
FIG. 14 shows the result of DCS safety testing of the high-Ni LiNiO2 in Example 6.

Safety properties of stoichiometric LiMO2 with $M=Ni_{4/15}(Mn_{1/2}Ni_{1/2})_{8/15}Co_{0.2}$, free of $Li_2CO_3$ impurity such as $LiMO_2$ disclosed in Example 3, were tested by DSC measurement. The result is disclosed in FIG. 14. Referring to FIG. 14, the total heat capacity is low, and the temperature where an exothermic reaction starts is high. Therefore, the safety is much improved when compared with the high-Ni cathode materials of Comparative Example 6.

Example 7

Polymer Cell of Large-Scale Sample

Stoichiometric $LiMO_2$ with $M=Ni_{4/15}$ $(Mn_{1/2}Ni_{1/2})_{8/15}Co_{0.2}$, free of $Li_2CO_3$ impurities as in Example 3 was electrochemically tested in a pilot plant polymer cell of 383562 type. The cathode was mixed with 17% $LiCoO_2$ and the cathode slurry was NMP/PVDF-based slurry. No additives for the purpose of preventing gelation, i.e., preventing the increase of viscosity, were added. During preparation such as coating, no gelation was observed. The anode was MCMB. The electrolyte was a standard commercial electrolyte free of additives known to reduce excessive swelling.

Figure 15:
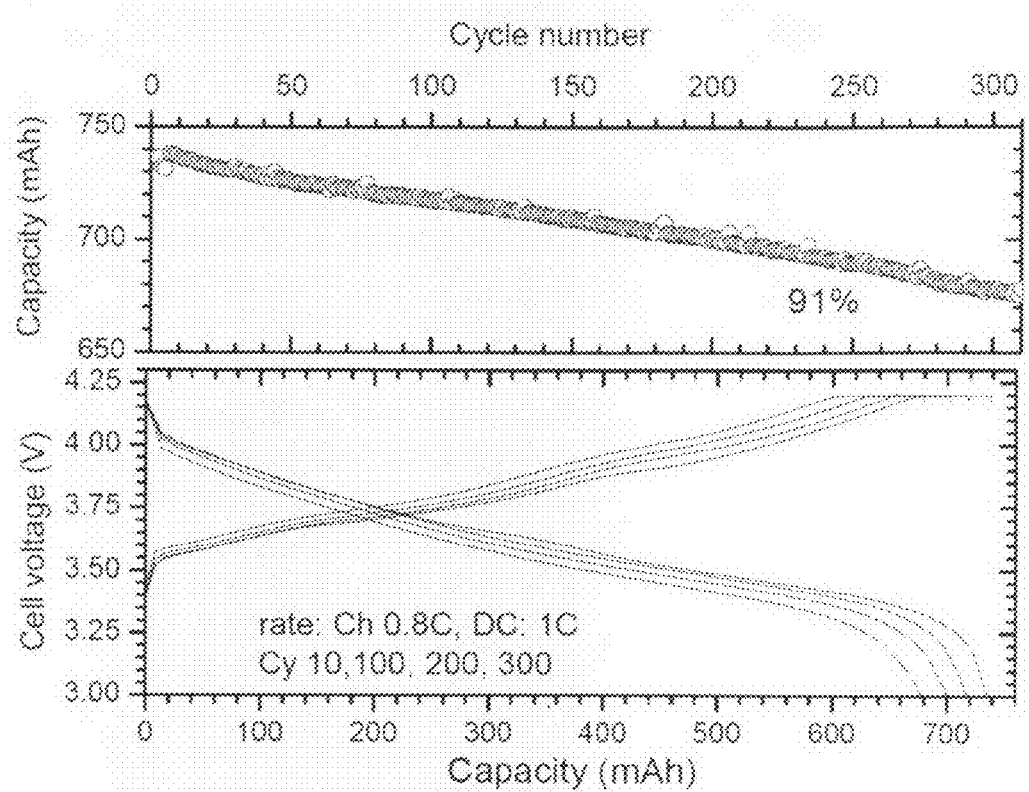
FIG. 15 shows the results of electrophysical properties tests on the polymer cell in Example 7.

FIG. 15 shows the cycling stability (0.8 C charge, 1 C discharge, 3~4 V, 2 V) at 25° C. ═An exceptional cycling stability (91% at C/1 rate after 300 cycles) was achieved at room temperature. The build-up of impedance was low. The cycling stability exceeds that of a similar $LiCoO_2$ cell. This can be explained by the comparable, large irreversible capacity of the high-Ni $LiNiO_2$, additionally supplying lithium which is consumed during cycling at the anode SEI.

Figure 16:
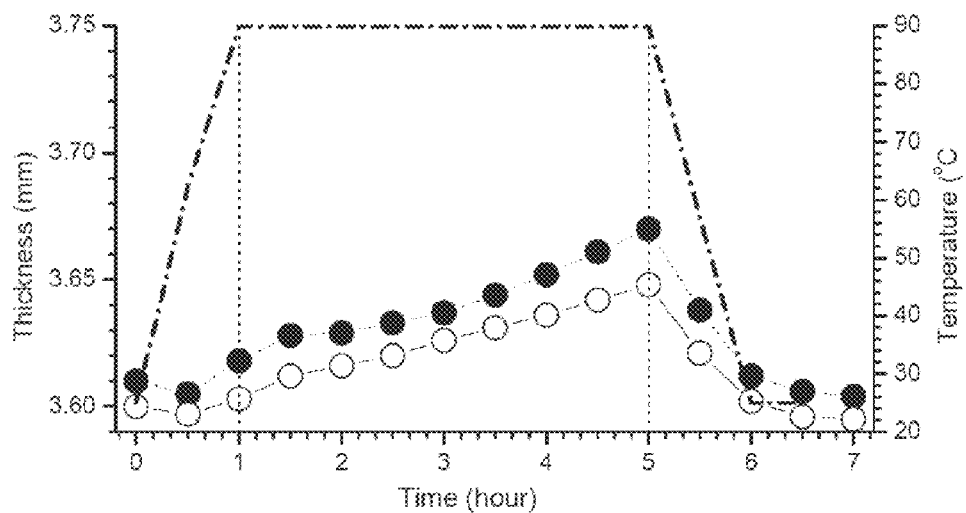
FIG. 16 is a graph showing the swelling of polymer cell during high T storage in Example 7.

Also, the gas evolution during storage was measured. During a 4 h-90° C. fully charged (4.2 V) storage, a very small amount of gas was evolved and, as shown in FIG. 16, only a small increase of thickness was observed. The increase of thickness was within or less than the value expected for good $LiCoO_2$ cathodes tested in similar cells under similar conditions.

This experiment provides very satisfying results regarding stability and storage properties of LiMO2 with $M=Ni_{4/15}(Mn_{1/2}Ni_{1/2})_{8/15}Co_{0.2}$ to make the cathode material fully competitive to $LiCoO_2$.

Example 8

Air stability of Large-Scale Sample

The air stability of stoichiometric nickel-based LiMO2 with $M=Ni_{4/15}(Mn_{1/2}Ni_{1/2})_{8/15}Co0.2$, free of Li2CO3 impurity of Example 3, was tested and also compared with that of the high nickel LiMO2.

Figure 17:
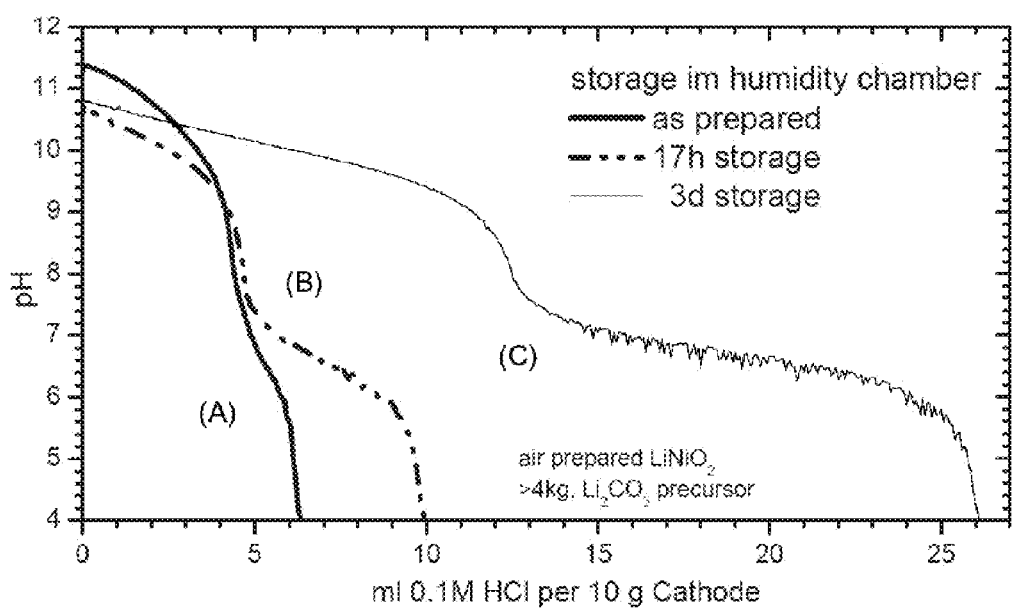
FIG. 17 is a graph showing the air stability of large-scale sample measured by pH titration in Example 8 in which (A) is for a fresh sample, (B) is for the sample after 17 h storage, and (C) is for the sample after 3 d storage.

Three pH titration measurements were performed. In the first measurement, the content of soluble base in a fresh sample was measured. In the second and third measurements, the soluble base content of stored samples was measured. The stored samples were held for 17 hours or 3 days at 60° C. in a humidity cell containing air rich in hydrocarbons. FIG. 17 shows the results thus obtained. LiMO2 with $M=Ni_{4/15}(Mn_{1/2}Ni_{1/2})_{8/15}Co_{0.2}$ (Example 7, FIG. 17) and the high-Ni sample (Comparative Example 4, FIG. 6) were simultaneously stored in the same humidity chamber.

Referring to FIG. 17, LiMO2 with $M=Ni_{4/15}(Mn_{1/2}Ni_{1/2})_{8/15}Co0.2$ is more stable in air. The decomposition kinetics is about 5 times slower than the decomposition of the high-Ni sample. In this connection, a careful X-ray investigation showed clear diffraction peaks of Li2CO3 impurity in the case of the high Ni sample, whereas no $Li_2CO_3$ diffraction peaks were observed in the case of $LiMO_2$ with $M=Ni_{4/15}(Mn_{1/2}Ni_{1/2})_{8/15}Co_{0.2}$.

Example 9

Inexpensive Transition Metal Precursors

The mixed hydroxide used in Example 3 had a high tap density (>2.0 g/cm3), prepared by coprecipitation of MSO4 and NaOH in the presence of excess ammonia (complexing additive). Ammonia in waste water causes environmental problems and hence is strictly regulated. Therefore, use of ammonia to reduce process costs should be avoided. It is, however, not possible to prepare the mixed hydroxide of a high density by a less expensive ammonia-free process.

More than 1 kg of the mixed MOOH, M=Ni4/15(Mn1/2Ni1/2)8/15Co0.2, was prepared by an ammonia-free coprecipitation of MSO4 and NaOH at 80° C. under pH-controlled conditions. A mixed hydroxide with a narrow particle size distribution was achieved. The tap density of the obtained hydroxide was approx. 1.2 g/cm3. Such hydroxides prepared by a less expensive process can be applied where the $LiMO_2$ tolerates more stringent sintering conditions, i.e., it has high sintering stability.

Figure 18:
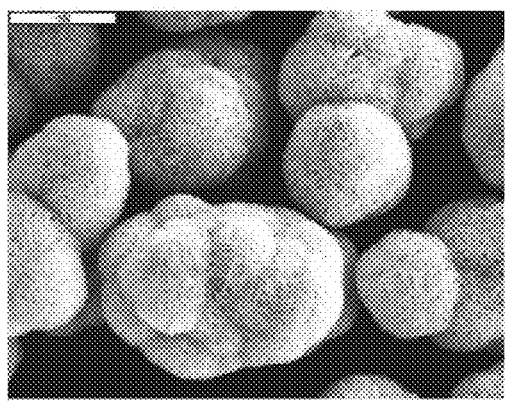
FIG. 18 is SEM micrographs (×5000) of the precursor and the final cathode material in Example 10 in which (A) is for a precursor prepared by an inexpensive ammonia-free process and having a low density, and (B) is for LiMO2 prepared in air using Li2CO3 as a precursor.
Figure 18B:
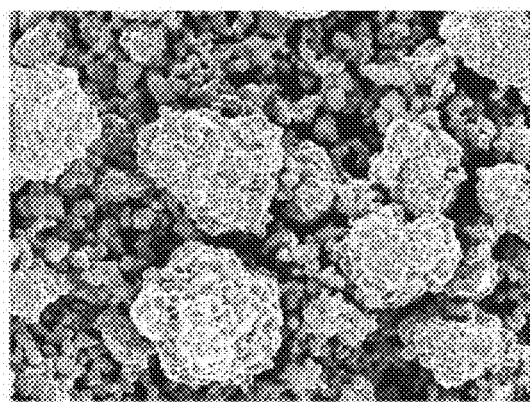

MOOH prepared by the ammonia-free process was used as a precursor to prepare 1 kg of LiMO2 by two-step cooking, and the sintering temperature was 930° C. The preparation process was performed in air and the lithium source was Li2CO3. FIG. 18 shows the precursor hydroxide and the final LiMO2 sample. Due to the stringent sintering, a grinding step was required such that some of the particles were broken, but the particles did not disintegrate as was observed for high Ni—LiMO2 (example 2). Properties (press density, amount of soluble base) of the resulting powder were tested. Electrochemical properties were tested on coin cells (Li anode) using 25° C. and 60° C. cycling. The properties were very similar to those disclosed in Example 5.

This experiment shows that stoichiometric LiMO2 can be successfully prepared by an inexpensive process based upon air and Li2CO3 and also a mixed hydroxide of low cost having a lower density, due to the good sintering stability thereof.

Example 10

Reproducibility of pH Titration 5 g of a commercial stoichiometric high-Ni $LiMO_2$ ($M=Ni_{0.8}Co_{0.2}$) ('sample A') and 5 g of stoichiometric $LiMO_2$ with $M=Ni_{4/15}(Mn_{1/2}Ni_{1/2})_{8/15}Co_{0.2}$ ('sample B') of Example 3 were tested by pH titration. The procedure was similar to that already described. First, 100 ml of solution was obtained by repeated soaking and decanting. Then, the pH profile of the solution was monitored by titrating 0.1M HCl until the pH reached below 3. The amounts of 0.1M HCl used to achieve pH=5 were 23 ml and 3 ml, respectively. Double the amount of HCl will be needed to reach pH 5 in the case of titrating 200 ml solution obtained from 10 g cathode. In this experiment, pH titration results are expressed as the amount (ml) of HCl needed to titrate 10 g cathode, 46 and 6 ml/10 g, respectively. The results were well reproducible. The same quantities were obtained for similar experiments in which the cathode powder was soaked for a longer time during the repeated decanting of the solution.

It is important to know how much soluble base is present in the solution, as measured by pH titration of the remaining powder. The cathode powder, after the solution was separated, was immersed in 100 ml water, and the pH profile of the resulting slurry was obtained by addition of 0.1M HCl. About 20 ml of 0.1M HCl was used per 10 g of cathode in the case of sample A so as to achieve pH below 5. On the other hand, less than 1 ml (per 10 g) was needed for sample (B). While, in the case of sample A, about 67% of soluble base was present in the solution, in the case of sample B, >80% of the soluble base was present in the solution.

It was also investigated whether or not the result depends on the titration speed. If HCl is added extremely slowly (i.e., >5 hours was taken for titration), then deviations of the pH profile would occur mostly at pH below 5. These deviations may be attributed to a slow ion-exchange process (H+ in solution←→Li+ in solid). However, this process is generally negligible at normal speed (i.e., about 30 min). The experiment showed that titration of the dissoluble base is reproducible. The base dissolves easily during repeated decanting. As a result, essentially all soluble bases are present in the solution, especially if the total content of soluble bases is not too high.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cathode active material comprising: a storage stable lithium transition metal oxide of the general formula $$Li_x((Ni_{1-a-b}(Ni_{1/2}Mn_{1/2})_aCo_b)_{1-k}A_k)_{2-x}O_2,$$

wherein $0.65 \leq a+b \leq 0.85$, $0.1 \leq b \leq 0.4$,
A is a dopant,
$0 \leq k \leq 0.05$, and
$0.95 \leq x \leq 1.05$,
wherein said lithium transition metal oxide has a stable layered crystalline microstructure having a normalized c:a ratio from about 1.0117 to about 1.0124.

2. The cathode active material of claim 1, wherein said lithium transition metal oxide has at least one of (a) a BET surface area between about 0.4 m²/g to about 0.8 m²/g, (b) a stable layered crystalline microstructure exhibiting cation mixing from about 3.9% to about 4.5% as measured by Reitveld refinement, or (c) a unit cell volume from about 33.902 Å³ to about 33.957 Å³.

3. The cathode active material of claim 1, wherein said lithium transition metal oxide has at least two of (a) a BET surface area between about 0.4 m²/g to about 0.8 m²/g, (b) a stable layered crystalline microstructure exhibiting cation mixing from about 3.9% to about 4.5% as measured by Reitveld refinement, or (c) a unit cell volume from about 33.902 Å³ to about 33.957 Å³.

4. The cathode active material of claim 1, wherein said lithium transition metal oxide has (a) a BET surface area between about 0.4 m²/g to about 0.8 m²/g, (b) a stable layered crystalline microstructure exhibiting cation mixing from about 3.9% to about 4.5% as measured by Reitveld refinement, and (c) a unit cell volume from about 33.902 Å³ to about 33.957 Å³.

5. The cathode active material of claim 1, wherein said lithium transition metal oxide is characterized by the formula of about $LiNi_{4/15}(Mn_{1/2}Ni_{1/2})_{8/15}Co_{0.2}O_2$ or $LiNi_{0.267}(Mn_{1/2}Ni_{1/2})_{0.53}Co_{0.2}O_2$ or $LiNi_{8/15}Mn_{4/15}Co_{3/15}O_2$.

6. A cathode active material comprising: a storage stable lithium transition metal oxide of the general formula $$Li_x((Ni_{1-a-b}(Ni_{1/2}Mn_{1/2})_aCo_b)_{1-k}A_k)_{2-x}O_2,$$

wherein $0.65 \leq a+b \leq 0.85$, $0.1 \leq b \leq 0.4$,
A is a dopant,
$0 \leq k \leq 0.05$, and
$0.95 \leq x \leq 1.05$,
wherein said lithium transition metal oxide has a stable layered crystalline microstructure exhibiting cation mixing from about 3.9% to about 4.5% as measured by Reitveld refinement.

7. The cathode active material of claim 6, wherein said lithium transition metal oxide has at least one of (a) a BET surface area between about 0.4 m²/g to about 0.8 m²/g, (b) a stable layered crystalline microstructure having a normalized c:a ratio from about 1.0117 to about 1.0124, or (c) a unit cell volume from about 33.902 Å³ to about 33.957 Å³.

8. The cathode active material of claim 6, wherein said lithium transition metal oxide has at least two of (a) a BET surface area between about 0.4 m²/g to about 0.8 m²/g, (b) a stable layered crystalline microstructure having a normalized c:a ratio from about 1.0117 to about 1.0124, or (c) a unit cell volume from about 33.902 Å³ to about 33.957 Å³.

9. The cathode active material of claim 6, wherein said lithium transition metal oxide is characterized by the formula of about $LiNi_{4/15}(Mn_{1/2}Ni_{1/2})_{8/15}Co_{0.2}O_2$ or $LiNi_{0.267}(Mn_{1/2}Ni_{1/2})_{0.53}Co_{0.2}O_2$ or $LiNi_{8/15}Mn_{4/15}Co_{3/15}O_2$.

10. A cathode active material comprising: a storage stable lithium transition metal oxide of the general formula $$Li_x((Ni_{1-a-b}(Ni_{1/2}Mn_{1/2})_aCo_b)_{1-k}A_k)_{2-x}O_2,$$

wherein $0.65 \leq a+b \leq 0.85$, $0.1 \leq b \leq 0.4$,
A is a dopant,
$0 \leq k \leq 0.05$, and
$0.95 \leq x \leq 1.05$,
wherein, said lithium transition metal oxide has a BET surface area between about 0.4 m²/g to about 0.8 m²/g.

11. The cathode active material of claim 10, wherein said lithium transition metal oxide has at least one of (a) a stable layered crystalline microstructure exhibiting cation mixing from about 3.9% to about 4.5% as measured by Reitveld refinement, (b) a stable layered crystalline microstructure having a normalized c:a ratio from about 1.0117 to about 1.0124, or (c) a unit cell volume from about 33.902 Å³ to about 33.957 Å³.

12. The cathode active material of claim 10, wherein said lithium transition metal oxide has at least two of (a) a stable layered crystalline microstructure exhibiting cation mixing from about 3.9% to about 4.5% as measured by Reitveld refinement, (b) a stable layered crystalline microstructure having a normalized c:a ratio from about 1.0117 to about 1.0124, or (c) a unit cell volume from about 33.902 Å³ to about 33.957 Å³.

13. The cathode active material of claim 10, wherein said lithium transition metal oxide is characterized by the formula of about $LiNi_{4/15}(Mn_{1/2}Ni_{1/2})_{8/15}Co_{0.2}O_2$ or $LiNi_{0.267}(Mn_{1/2}Ni_{1/2})_{0.53}Co_{0.2}O_2$ or $LiNi_{8/15}Mn_{4/15}Co_{3/15}O_2$.

14. A cathode active material comprising: a storage stable lithium transition metal oxide of the general formula $$Li_x((Ni_{1-a-b}(Ni1/2Mn_{1/2})_aCo_b)_{1-k}A_k)_{2-x}O_2,$$

wherein $0.65 \leq a+b \leq 0.85$, $0.1 \leq b \leq 0.4$,
A is a dopant,
$0 \leq k \leq 0.05$, and
$0.95 \leq x \leq 1.05$,
wherein, said lithium transition metal oxide has a unit cell volume from about 33.902 Å³ to about 33.957 Å³.

15. The cathode active material of claim 14, wherein said lithium transition metal oxide has at least one of (a) a BET surface area between about 0.4 m²/g to about 0.8 m²/g, (b) a stable layered crystalline microstructure exhibiting cation mixing from about 3.9% to about 4.5% as measured by Reitveld refinement, or (c) a stable layered crystalline microstructure having a normalized c:a ratio from about 1.0117 to about 1.0124.

16. The cathode active material of claim 14, wherein said lithium transition metal oxide has at least two of (a) a BET surface area between about 0.4 m$^2$/g to about 0.8 m$^2$/g, (b) a stable layered crystalline microstructure exhibiting cation mixing from about 3.9% to about 4.5% as measured by Reitveld refinement, or (c) a stable layered crystalline microstructure having a normalized c:a ratio from about 1.0117 to about 1.0124.

17. The cathode active material of claim 14, wherein said lithium transition metal oxide is characterized by the formula of about LiNi$_{4/15}$(Mn$_{1/2}$Ni$_{1/2}$)$_{8/15}$Co$_{0.2}$O$_2$ or LiNi$_{0.267}$(Mn$_{1/2}$Ni$_{1/2}$)$_{0.53}$Co$_{0.2}$O$_2$ or LiNi$_{8/15}$Mn$_{4/15}$Co$_{3/15}$O$_2$.

* * * * *